US012681918B2

(12) United States Patent
Liu et al.

(10) Patent No.: US 12,681,918 B2
(45) Date of Patent: Jul. 14, 2026

(54) MULTIPLE CACHING OPERATIONS TO SUPPORT OFFLINE EXECUTION

(71) Applicant: Salesforce, Inc., San Francisco, CA (US)

(72) Inventors: Angela Mu Liu, Mountain View, CA (US); Puneet Dhaliwal, Dublin, CA (US); Dai Duong Doan, Alameda, CA (US); Graham Phillip Oldfield, London (GB); Jamie Wutke, Halifax (CA); Shanis Kurundrayil, Brentwood, CA (US); Limor Rohald, Rishon LeZion (IL); Kevin Tsugio Ota, Los Angeles, CA (US); Aleksandra Zhulina, Woodland Hills, CA (US)

(73) Assignee: Salesforce, Inc., San Francisco, CA (US)

( * ) Notice: Subject to any disclaimer, the term of this patent is extended or adjusted under 35 U.S.C. 154(b) by 38 days.

(21) Appl. No.: 18/162,549

(22) Filed: Jan. 31, 2023

(65) Prior Publication Data

US 2024/0256523 A1 Aug. 1, 2024

(51) Int. Cl.
*G06F 16/23* (2019.01)

(52) U.S. Cl.
CPC ...... *G06F 16/2372* (2019.01); *G06F 16/2365* (2019.01)

(58) Field of Classification Search
CPC .......................... G06F 16/2365; G06F 16/2372
USPC .......................................................... 707/690
See application file for complete search history.

(56) References Cited

U.S. PATENT DOCUMENTS

| | | | |
|---|---|---|---|
| 9,424,329 B2 | 8/2016 | Kothule | |
| 9,819,568 B2 | 11/2017 | Doan | |
| 9,910,663 B1 * | 3/2018 | Biear | G06F 8/65 |
| 9,983,771 B2 | 5/2018 | Martin | |
| 10,152,497 B2 | 12/2018 | Doan | |
| 10,171,720 B2 | 1/2019 | Lohan | |
| 10,387,388 B2 | 8/2019 | Doan | |

(Continued)

FOREIGN PATENT DOCUMENTS

| | | |
|---|---|---|
| EP | 2798833 A1 | 11/2014 |
| EP | 2867760 A2 | 5/2015 |

(Continued)

*Primary Examiner* — Boris Gorney
*Assistant Examiner* — Nicholas E Allen
(74) *Attorney, Agent, or Firm* — Kowert, Hood, Munyon, Rankin & Goetzel, P.C.; Mark D. Seegers; Dean M. Munyon

(57) ABSTRACT

Techniques for caching for an application executable on a mobile device, where the application has a user interface that includes a set of templates specifying data fields that reference record data from a database. The application is executable when the mobile device is online to communicate with an application server to access sufficient record data to fully render templates for those portions of the user interface selected by a user. The set of caching operations can include a record caching operation that caches records according to a default and/or custom set of rules for all versions of the application; a template caching operation that causes selected template data to be cached; and a template-record caching operation that causes a set of record data to be cached such that templates for the cached selected template data will fully render offline for a specified set of records.

16 Claims, 16 Drawing Sheets

(56) References Cited

U.S. PATENT DOCUMENTS

| 10,885,079 B2 | 1/2021 | Ota |
| 10,901,996 B2 | 1/2021 | Doan |
| 10,915,519 B2 | 2/2021 | Dandy |
| 10,949,395 B2 | 3/2021 | Doan |
| 11,113,244 B1 * | 9/2021 | Chen .................. G06F 16/1744 |
| 11,128,624 B2 | 9/2021 | Wijaya |
| 11,164,118 B1 | 11/2021 | Doan |
| 11,182,719 B1 | 11/2021 | Doan |
| 11,232,159 B1 * | 1/2022 | Mathews ............. G06F 40/117 |
| 11,418,616 B1 * | 8/2022 | Kumar ................... H04L 67/55 |
| 2008/0005057 A1 * | 1/2008 | Ozzie ................. G06F 16/9574 |
| 2010/0162126 A1 * | 6/2010 | Donaldson ......... G06F 16/9574 |
| | | 715/738 |
| 2012/0064925 A1 | 3/2012 | Dhaliwal |
| 2014/0379839 A1 * | 12/2014 | Dou ................... G06F 16/9574 |
| | | 709/213 |
| 2016/0034581 A1 | 2/2016 | Doan |
| 2016/0210020 A1 * | 7/2016 | Lacas ................. H04L 67/5682 |
| 2017/0228353 A1 * | 8/2017 | Baldwin ............... G06F 40/143 |
| 2017/0243120 A1 | 8/2017 | Doan |
| 2017/0277768 A1 | 9/2017 | Doan |
| 2017/0293629 A1 | 10/2017 | Doan |
| 2018/0012232 A1 * | 1/2018 | Sehrawat ........... H04M 3/5141 |
| 2018/0189792 A1 | 7/2018 | Vaishnav |
| 2018/0293586 A1 | 10/2018 | Doan |
| 2019/0065217 A1 * | 2/2019 | Girdhar ............... G06F 9/44505 |
| 2019/0163664 A1 * | 5/2019 | Karani ............. G06F 15/17331 |
| 2019/0236125 A1 * | 8/2019 | Loeppky .............. G06F 40/117 |
| 2019/0236195 A1 | 8/2019 | Sutedjo-The |
| 2019/0236217 A1 | 8/2019 | Eroshin |
| 2019/0320038 A1 * | 10/2019 | Walsh ................. G06F 16/9574 |
| 2020/0073770 A1 | 3/2020 | Mortimore, Jr. |
| 2020/0099760 A1 | 3/2020 | Schneyer |
| 2020/0104347 A1 * | 4/2020 | Abrahami ............. G06F 16/958 |
| 2020/0106860 A1 * | 4/2020 | Sullivan ................. H04L 67/59 |
| 2020/0134529 A1 | 4/2020 | Dhaliwal |
| 2020/0210961 A1 | 7/2020 | Rosental |
| 2020/0244730 A1 * | 7/2020 | Eteminan ........... H04L 67/1095 |
| 2021/0081848 A1 * | 3/2021 | Polleri ............... G06F 18/2155 |
| 2021/0279079 A1 * | 9/2021 | Shrivastava ....... G06Q 30/0601 |
| 2021/0303154 A1 * | 9/2021 | Zhang .................. G06F 3/0685 |
| 2021/0365855 A1 | 11/2021 | Doan |
| 2021/0365862 A1 | 11/2021 | Doan |
| 2022/0075667 A1 * | 3/2022 | Pany .................... G06F 11/323 |
| 2022/0245560 A1 | 8/2022 | Dhaliwal |
| 2022/0248165 A1 | 8/2022 | Dhaliwal |
| 2022/0366383 A1 * | 11/2022 | Melcer ................ G06Q 20/326 |
| 2022/0385730 A1 * | 12/2022 | Hua ................... H04N 21/8355 |
| 2022/0405809 A1 * | 12/2022 | AlDarabsah ..... H04N 21/26208 |
| 2022/0414609 A1 | 12/2022 | Doan |
| 2022/0414610 A1 | 12/2022 | Doan |

FOREIGN PATENT DOCUMENTS

| GB | 2404127 B | 12/2005 |
| WO | 2004114117 A3 | 9/2005 |
| WO | 2012033586 A2 | 3/2012 |
| WO | 2013097898 A1 | 7/2013 |
| WO | 2013101813 A1 | 7/2013 |

* cited by examiner

200

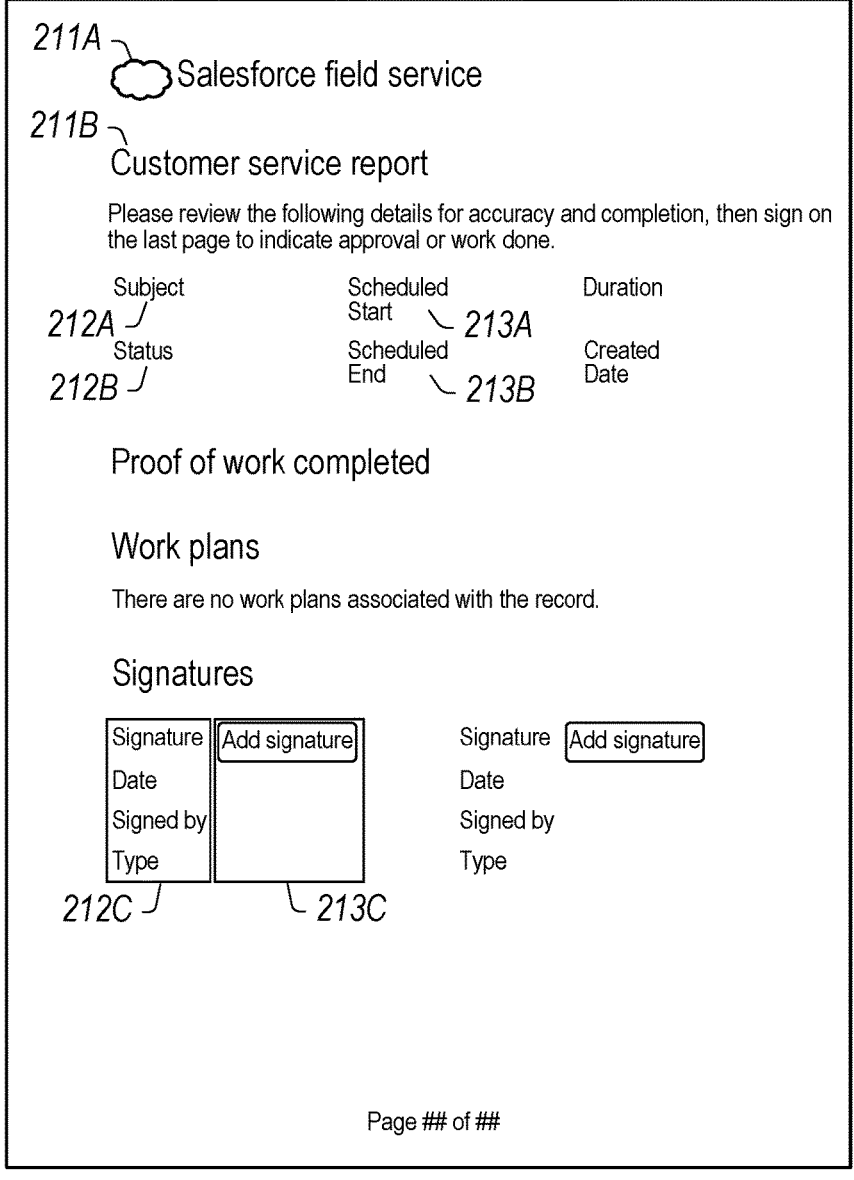

*Layout 210*

211A

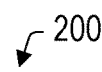 Salesforce field service

211B

Customer service report

Please review the following details for accuracy and completion, then sign on the last page to indicate approval or work done.

Subject                    Scheduled              Duration
                           Start
212A                                213A Status                     Scheduled              Created
                           End                    Date
212B                                213B Proof of work completed Work plans There are no work plans associated with the record.

Signatures

| Signature | Add signature |
|-----------|---------------|
| Date      |               |
| Signed by |               |
| Type      |               |

212C          213C

Signature   Add signature
Date
Signed by
Type

Page ## of ##

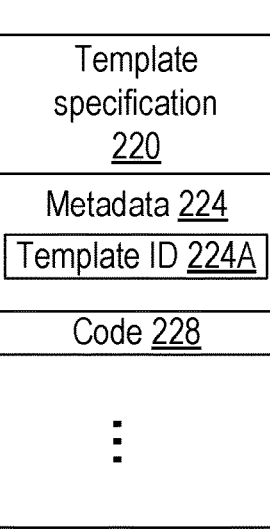

| Template specification 220 |
|-----------------------------|
| Metadata 224 |
| Template ID 224A |
| Code 228 |
| ⋮ |

FIG. 2A

130 dB queries
415

Records
416

Queries
424

Responses
426

Application call 412

Responses
414

Caching request
138

Cached data
148

Responses   Queries
426     424

Caching request
138

Cached data
148

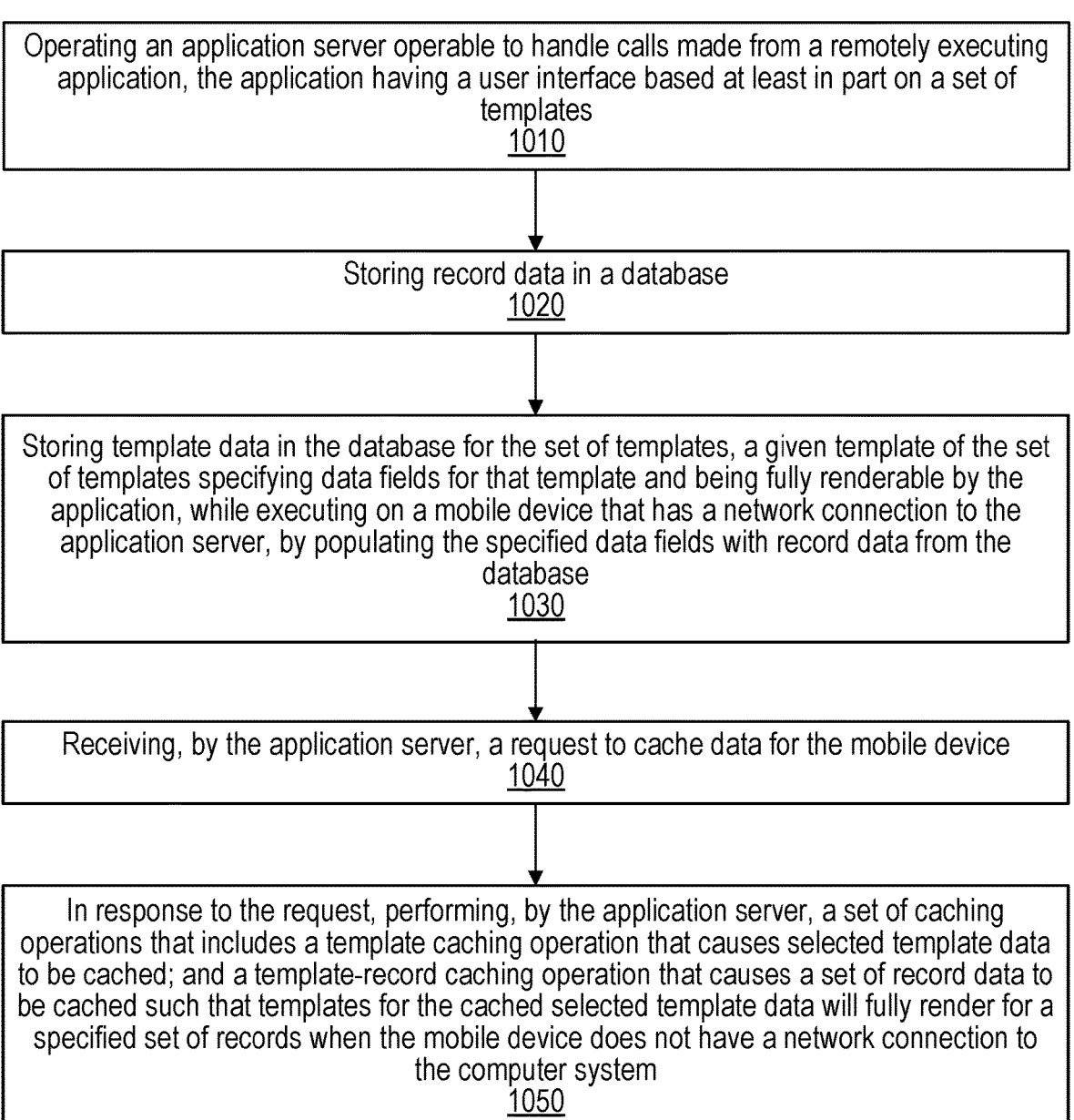

1000

Operating an application server operable to handle calls made from a remotely executing application, the application having a user interface based at least in part on a set of templates
1010

Storing record data in a database
1020

Storing template data in the database for the set of templates, a given template of the set of templates specifying data fields for that template and being fully renderable by the application, while executing on a mobile device that has a network connection to the application server, by populating the specified data fields with record data from the database
1030

Receiving, by the application server, a request to cache data for the mobile device
1040

In response to the request, performing, by the application server, a set of caching operations that includes a template caching operation that causes selected template data to be cached; and a template-record caching operation that causes a set of record data to be cached such that templates for the cached selected template data will fully render for a specified set of records when the mobile device does not have a network connection to the computer system
1050

FIG. 10

MULTIPLE CACHING OPERATIONS TO SUPPORT OFFLINE EXECUTION

BACKGROUND

Technical Field

This disclosure relates generally to software caching, and more specifically to the caching of data to support offline data completion during execution of a mobile application.

Description of the Related Art

Mobile devices are ubiquitous in today's society. Users rely on a variety of mobile applications for both personal and professional needs. Many of these applications rely on an Internet connection in order to obtain data and provide full utility to the user.

Although Internet connectivity is widespread in many areas (e.g., there are various estimates that over 90% of the U.S. population has Internet access), there are many (typically less populated areas) that do not have coverage. This presents a problem when being offline is not merely a matter of inconvenience. For example, there are certain jobs that may need to be performed in areas without an Internet connection. Field service technicians provide a common example. These individuals often work with products that cannot easily be supported because of their size or connectivity with other systems. Field service technicians often service home or office-based equipment such as appliances, cable or networking systems, computers, or heavy equipment such as farm equipment, diesel engines, factory machines, and the like. Like many other professions, a field service technician may use an application executing on a mobile device such as a phone, tablet, or laptop to perform certain job-related functions. Such tasks may include finding the contact information and address of a customer, accessing support documentation from the organization, tracking the progress of a particular service procedure, etc.

Thus, unlike the situation in which a user can simply forgo use of the relevant mobile applications while there is no Internet service, this is not an option in situations such as the field services technician use case. In some scenarios, it can be simple to download the required data in advance of a period of offline connectivity. In other cases, this task is not so straightforward.

BRIEF DESCRIPTION OF THE DRAWINGS

FIG. 2A is an example of a template, including a template specification and a template layout.

FIG. 10 is a flow diagram of one embodiment of a method for performing template and record caching.

DETAILED DESCRIPTION

Figure 1A:
FIGS. 1A-B are block diagrams of one embodiment of a computer system that performs software caching to support offline data completion for a mobile application.
Figure 1A:
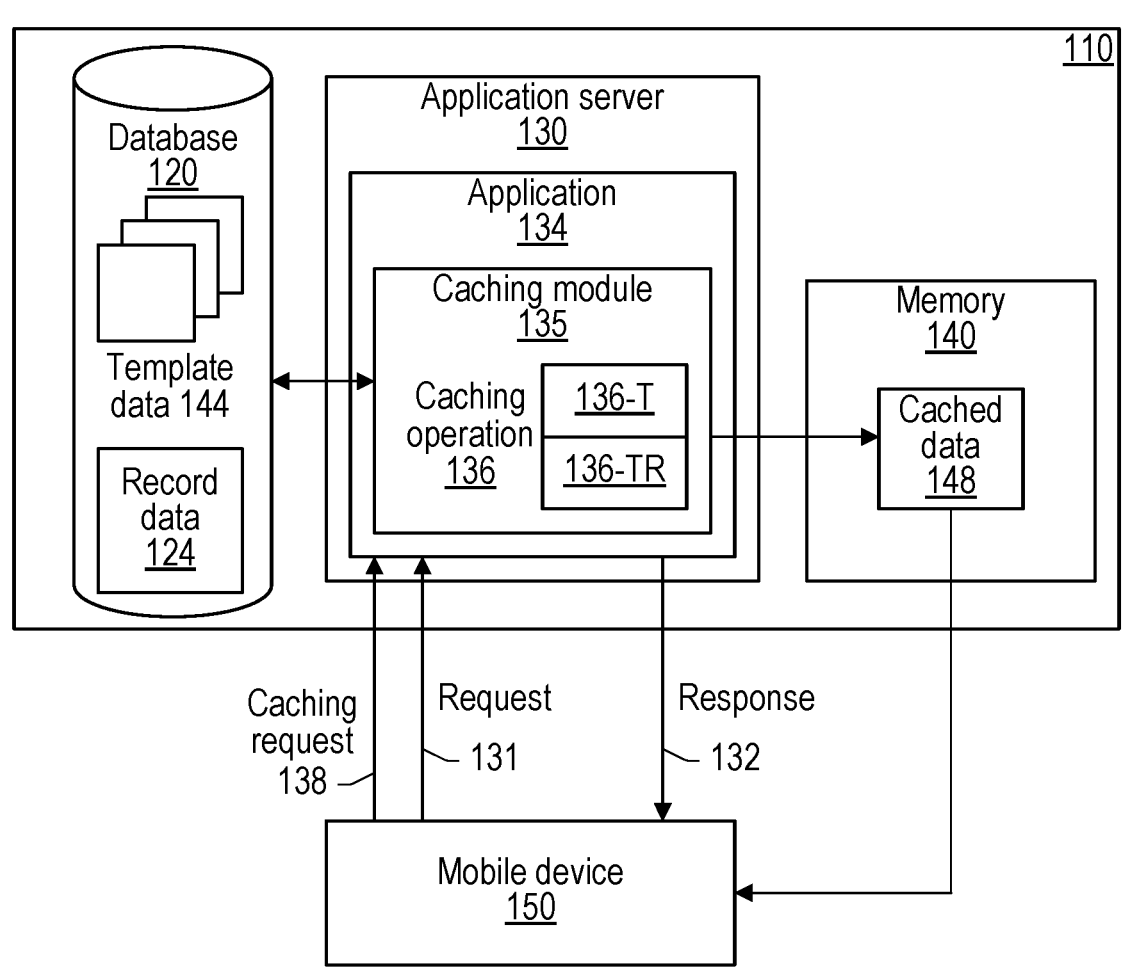

In some scenarios, intelligently caching data in advance of offline operation is complicated. This problem can be exacerbated when the application for which caching is desired can have different versions for different clients. Consider, for example, a field services product that is implemented as a cloud-based product that stores data on behalf of clients/companies—for example, the SALES-FORCE Field Services product. (A given client/company could be considered to constitute one or more entities or organizations from the perspective of the cloud computing company. Thus, companies A and B might be considered to be two different organizations (e.g., database tenants) from the perspective of the cloud computing company. In some cases, a particular company might include more than one organization (or database tenant) depending on size.) A mobile application associated with the field services product might have certain base or default functionality that is available to all clients. A "native" version of the mobile application can present this base functionality to users (e.g., the display of a service order form and other standard information) via a base/default/native user interface (UI).

But clients of the cloud computing company will commonly have different business needs. They will therefore have different needs for their mobile applications. Accordingly, a common scenario is for an application provider to permit clients to extend or supplement the native version of the mobile application to include a supplemental portion of the UI. This approach allows clients to customize the mobile application to their particular needs, permitting, among other things, workflows that are specific to their businesses. This customization results in what are, in effect, different versions of the mobile application.

Against this backdrop, users of the client (e.g., field service technicians who work for customers of the provider of the field services support server-based product) have a strong desire for data to be present in those portions of the UI that they utilize while performing their jobs. In other words, clients desire to have "data completion" both for portions of the UI, meaning that a field in a screen of the UI will not be blank or cause an exception based on the unavailability of the data. This is typically easily achieved when the mobile device on which the mobile application is executing is online (that is, connected to the Internet). But the same desire exists even when the mobile device is offline.

Unfortunately, in many enterprise applications, there is a huge amount of data that could potentially be cached. Accordingly, a "cache-everything" strategy may not be practical from a standpoint of mobile device space constraints or caching time. Furthermore, from the perspective of the software provider, the extensibility of the mobile application means that it is not practical to design a one-size-fits-all caching strategy that would satisfy all clients, many of whom may have unique workflows that other clients do not have. It may also be challenging for certain clients to easily determine how to formulate a caching strategy since the data is maintained by a different entity (e.g., the cloud-solution provider).

To address the problem of UI data completion, particularly for customized UI portions, the inventors propose to perform separate caching operations. These caching operations include a "template" caching operation in which selected template data (which can be thought of as the framework of a customized UI portion, but not the content of the data fields) is cached. The caching operations further include a "template-record" caching operation in which a specified set of records (which can be linked to respective templates) is pre-rendered while online for each template, storing the results such that they can be transferred as cached data to the mobile device. This approach can help ensure data completion for the selected templates and records. For example, the specified set of records may correspond to a set of records having time values within a specified time range (e.g., all service appointments with X days) and/or records associated with a particular set of locations. Further, some records may have data dependencies (e.g., the value of a field linked from an initial record may exist in some other data object). Accordingly, an analysis of record data dependencies and fetching of any additional records identified by this analysis can also help ensure data completion.

Figure 1B:
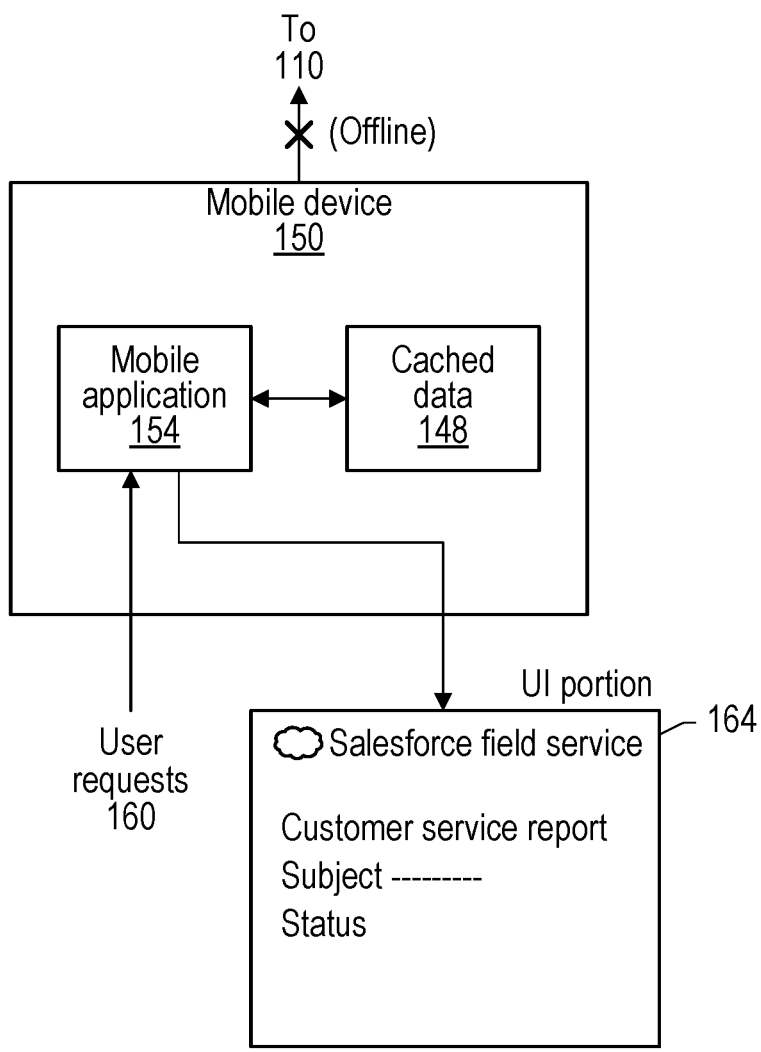

This approach can be seen in FIGS. 1A-B, which depict block diagrams of one embodiment of a computer system that performs software caching to support offline data completion for a mobile application. As shown in FIG. 1A, computer system 100 includes a server system 110 and a mobile device 150. Server system 110, which may be a cloud computer system in some embodiments, includes a database 120, an application server 130, and a memory 140.

Record data 124 and template data 144 for a particular client associated with mobile device are stored in database 120. This data facilitates the display of UI elements by mobile device 150. Template data 144 corresponds to one or more templates, each of which specifies the format of a portion of a UI (e.g., a UI page). A template specification may include certain fixed elements (e.g., the text "Social Security Number"), as well as data fields that reference the actual data values. These actual data values are found in record data 124.

Application server 130 runs a server portion of application 134. While mobile device 150 is connected to application server 130 (i.e., mobile device 150 is online), a mobile version of the application (not pictured in FIG. 1A) can make requests 131 to application 134, which provides responses 132 in return. These responses may include, for example, portions of record data 124 and template data 144.

Application 134 can also receive a caching request 138. In some cases, request 138 may originate from mobile device 150, while in other cases, request 138 originates from another source.

As shown, application 134 includes caching module 135, which includes code that performs a set of caching operations 136. These operations perform different functions, and therefore will typically result in the caching of different types of information. Specifically depicted in FIG. 1A are caching operations 136-T and 136-TR. Operation 136-T is a template caching operation that causes a specified set of templates to be cached. Operation 136-TR, on the other hand, is a template-record caching operation that cause a specified set of records to be pre-rendered relative to their corresponding templates (note that records can be linked to templates), with the results cached. As will be described, in some embodiments, operation 136-TR can involve identifying data dependencies in any of the specified set of records and fetching any records implicated by the identified data dependencies in order to help ensure data completion for the selected template-record pairs. In some cases, operations 136-T and 136-TR can further be based on machine learning recommendations and/or user-specified record restrictions such as those on time and/or location.

FIG. 1B is a block diagram of mobile device 150 that shows the result of caching operations 136. As shown, mobile application 154 is executing on mobile application 150, which is currently offline relative to server system 110. Mobile device 150 stores cached data 148. This data may have been stored on mobile device 150 as the result of caching request 138, or by transferring cached data 148 from server system 110 to mobile device 150 after the conclusion of caching operations 136. Cached data 148 allows mobile application 154 to satisfy user requests 160, with data completion, as shown by UI portion 164.

The disclosed approach advantageously allows users to experience increased offline data completion for portions of a UI for a mobile application. In particular, the disclosed caching operations can be useful for customized UI portions. These techniques attempt to strike a balance between the size of the cached data and the likelihood of data completion for end users while offline.

Templates and Records

Before describing more details relating to caching operations 136, it will be instructive to discuss certain features relating to UI templates and records that supply data for such templates. FIG. 2A illustrates one example of a UI template 200. As used herein, a "template" is a specification or form for creating a portion of a UI.

As shown, template 200 is based on a template specification 220 that, when rendered, produces a UI portion with layout 210. This particular example illustrates a customer service report. This is, of course, just one possible example of a template. Note that a template can constitute the entirety or just a portion of a UI screen or view. In one embodiment, template 200 can correspond to a component of a SALES-FORCE LIGHTNING UI page. Templates can be used to specify portions of either a native UI or a supplemental UI. In certain embodiments, templates are used to specify only the supplemental portion of the UI, while the native portion of the UI may be specified via different means (e.g., via the SWIFT programming language).

Template specification 220 includes metadata 224 about template 200 as well as code 228, which is usable to render a UI portion based on template 200, along with associated data values. Template metadata 224 refers to any information about layout 210 other than code 228. For example, metadata 224 can include a template identification value 224A. As will be described later, value 224A can be used to link a data record to its associated template. Template metadata 224 might also include information such as template name, template version, related templates, etc.

Code 228 is operable to cause a static portion of a UI to be generated. A template is just a framework of a UI, as it specifies those parts of a UI that do not change between instantiations of the template. Code 228 is thus executable to cause layout 210 to be rendered as part of a UI. As shown, layout 210 does not include variable values. A particular instantiation of a template can specify particular record values to be inserted or injected into data fields 213. Any suitable programming language can be used to specify a template. In some embodiments, code 228 is written in a markup language such as HTML/CSS. In some cases, code 228 may cause a template to render differently on different types of computing devices. For example, a particular template might be rendered using a first layout for laptop devices, using a second layout for mobile phones, and a third layout for tablet devices. In this manner, a particular template can be compatible with different types of mobile devices 150.

As shown, layout 210 depicts what a UI portion would look like when rendered with code 228 and no data values. Layout 210 includes graphical elements 211, text elements 212, and data fields 213. Elements 211 and 212 and fields 213 are placed at particular locations within the UI portion as specified by code 228. As noted, graphical elements 211 and text elements 212 are constant values across different instantiations of template 200.

In some cases, elements 211 and 212 have no associated data fields 213. In other cases, these elements, particularly text elements 212, do have associated data fields 213. For example, text element 212A ("Subject") has an associated data field 213A. The value for data field 213A may be pulled from a record within database 120. A similar relationship exists between text element 212B and data field 213B. The values for some data fields may not pull from database 120 in some cases, but may instead populate with values input directly from mobile device 150. For example, the value for data field 213C ("Signature") might be input via a stylus on a tablet mobile device 150 in the field. Layout 210 can be generated within any suitable environment, for example it may be rendered as a webpage within a browser by an HTML engine.

Figure 2B:
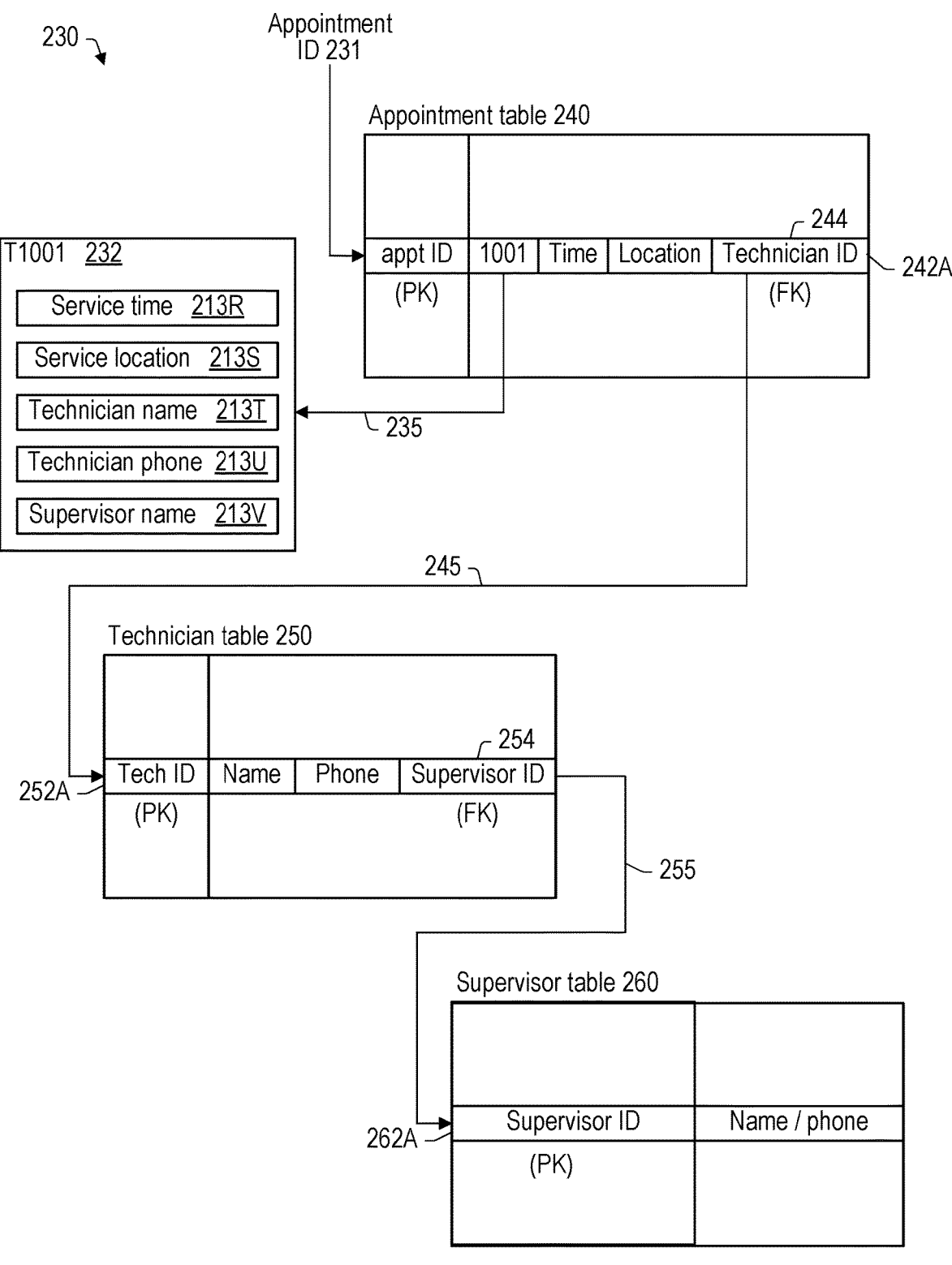
FIG. 2B provides an example of several interconnected database objects, as well as a template associated with a record of one such database object.

Having discussed the use of templates, FIG. 2B now provides an example of data records that can be used in conjunction with templates to render UI portions. FIG. 2B depicts an example of a UI portion 230 that includes fields 213R-V, which deal with different portions of a service appointment. Field 213R is the service time. Field 213S is the appointment ID, field 213T is the service technician name, field 213U is the service technician number, and 213V is the technician's supervisor's name. Various database objects that include records that store the data values for fields 213R-V are also depicted-namely, appointment table 240, technician table 250, and supervisor table 260.

In many cases, enterprise data records are stored in complex relational databases having many interrelated objects. Example 230 illustrates such interrelationships. Appointment table 240 is a table listing service appointments, where each record corresponds to a different service appointment. In this example, service appointment fields 213 are part of a template 232 for rendering a UI portion relating to the service appointment.

Rendering of a UI portion based on template 232 will commence based on a service appointment ID. As shown, table 240 is organized such that appt_id is used as a primary key (PK) for the table. Record 242A also includes column such as appointment time and appointment location. Still further, record 242A also includes a column for technician id, which is a foreign key (FK) that is used to index into technician table 250.

Technician table 250 is organized such that the technician id is used as a primary key. In this manner, when record 242A is retrieved, the technician id found in column 244 provides a means to access record 252A in technician table 250 to obtain the name of the technician for a particular service call. Record 252A also includes column 254, which is the supervisor id for the technician. Column 254 is also a foreign key for indexing into supervisor table 260. Record 252A also can also include other types of information such as the technician's phone number, years of service, etc.

Supervisor table 260 is organized such that the supervisor id is used as a primary key. In this manner, when record 252A is retrieved, the supervisor id found in column 254 provides a means to access record 262A in supervisor table 260 to obtain the name of the supervisor of the technician for the particular service call. Record 262A can also include other information about the supervisor, such as name, phone number, years of service, etc.

As shown, record 242A in table 240 includes a template id (1001) that corresponds to a template that includes service appointment fields 213R-V. For the service appointment corresponding to record 242A, then, template 232 can be selected using the template id (1001) specified in the record. Template 232 can then be rendered using the primary key appointment ID 231 as a starting point. A first database access 235 to table 240 using appointment ID 231 will return several items of information needed to complete template 232, including service time (field 213R) and service location (213S). Several items of information needed to complete template 232 are still needed in spite of this first access, however. For example, service technician name (213T), telephone number (213U), and supervisor name (213V) are still missing.

The technician id in column 244 of table 240 can be used as a primary key to access technician table 250. Once a second database access 245 to table 250 is made, another two pieces of information needed to complete fields 232 are returned: technician name (213T) and telephone number (213U). The name of the technician's supervisor (213V) is still unavailable despite these two database accesses. The supervisor id in column 254 of table 250 can be used as a primary key to access supervisor table 260, however. Once this third database access 255 to table 260 is made, the final piece of information needed to complete template 232 is returned: supervisor name (213V).

FIG. 2B thus illustrates that a given set of data fields in a template may require multiple calls to different database objects in order to ensure data completion for that template. It may not be possible to determine in advance how many calls will be required, as different types of fields are resolvable with different numbers of calls. Accordingly, simply making a predetermined number of database fetches for records for all templates may miss records that include relevant data, and thus prevent a template from fully rendering (that is, making sure the template framework renders and that all data fields in a template have the same values displayed offline as would be displayed online). For example, rendering a UI portion for fields 213R-V with only two database calls will result in an UI in which fields 213R-U, but not field 213V, are populated. This variation in data dependencies makes data caching for mobile device applications difficult. Caching based on too few a number of levels can result in incomplete data, while caching on too many levels can result in a bloated amount of data, as well as increased caching time.

Native and Supplemental User Interfaces

Figure 3:
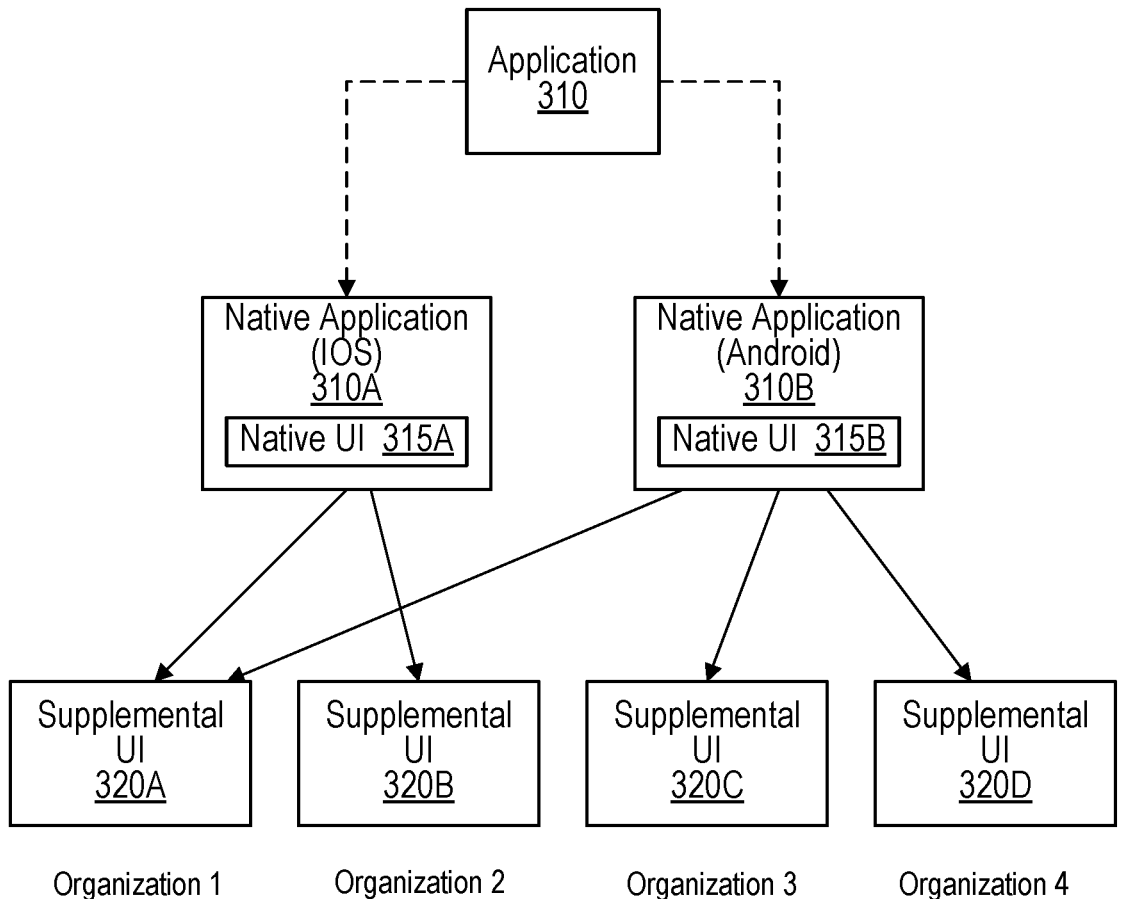
FIG. 3 depicts an application having different native and supplemental versions.

Having briefly described records and templates, the discussion now turns to the potential interplay between native and supplemental portions of a user interface. FIG. 3 depicts an application 310, which is implemented in two different environments as native applications 310A and 310B. In this example, native application 310A is written for IOS devices, while native application 310B is written for ANDROID devices. Other environments are of course possible. Native applications 310 may be written in different programming languages. For example, native application 310A may be written in SWIFT, while native application 310B may be written in and in JAVA or KOTLIN. Each native application 310 includes a portion of code that renders a respective native UI (315A-B).

As has been explained, application 310 may, in some cases, provide core functionality in a particular area (e.g., field services support). But the clients of the provider of application 310 will commonly have different business needs relating to the subject matter of application 310. For example, a cable TV company will have different work flows than a solar panel installation company.

In order to provide the best possible user experience for its client, the provider of application 310 may make application 310 extensible to address additional business functionality, thus leading to corresponding additional portions of the UI. These portions are shown in FIG. 3 as supplemental UIs 320. As described herein, supplemental UIs 320 are rendered using templates and records.

In many cases, it is desirable to code templates in a cross-platform language (e.g., HTML), which means one specification of a template can be rendered on applications for any type of device. In some instances, templates may be specified using the SALESFORCE LIGHTNING standard. Thus, the same supplemental UI 320A can be used to extend application 310 for both the IOS platform (which has native UI 315A) and the ANDROID platform (native UI 315B) for organization 1. (Some clients may have users in the field with both IOS and ANDROID mobile devices.) FIG. 3 also shows that organization 2 can extend native application 310A for the IOS platform with supplemental UI 320B, which can have different work flows and content than supplemental UI 320A. Similarly, organizations 3 and 4 can extend ANDROID native application 310B with supplemental UIs 320C-D, respectively.

In some cases, native UIs and supplemental UIs will have different data formats. This is particularly likely when the supplemental UIs are specified using non-native programming languages. The use of two different UIs can also result in different data formats for data used by the different UIs (e.g., data for IOS portion vs. data for LIGHTNING components). This may affect how mobile application 154 stores cached data, as will be described in the next section.

Server and Client Caching Architecture

Figure 4A:
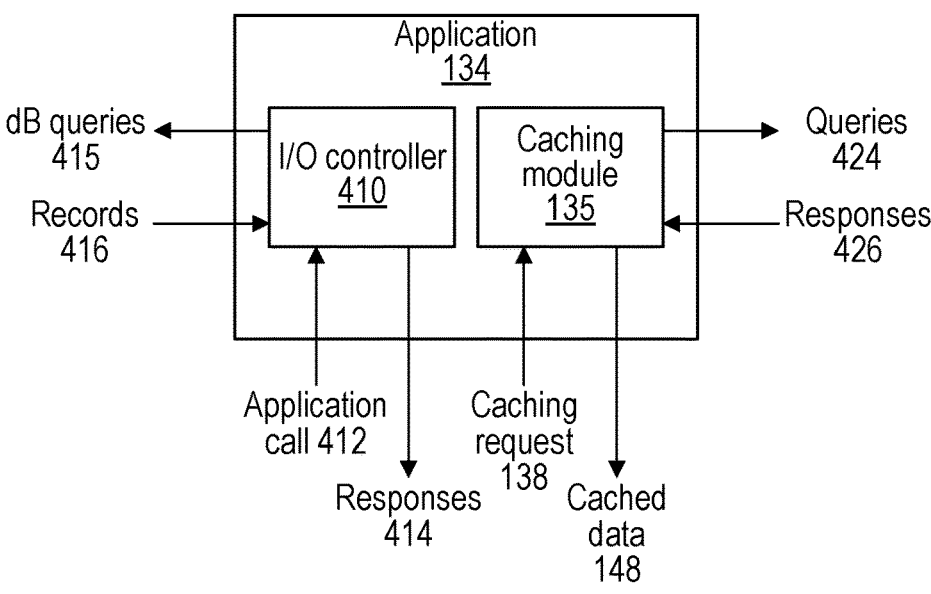
FIG. 4A is a block diagram that shows components of one embodiment of a server application that supports remote execution.
Figure 4B:
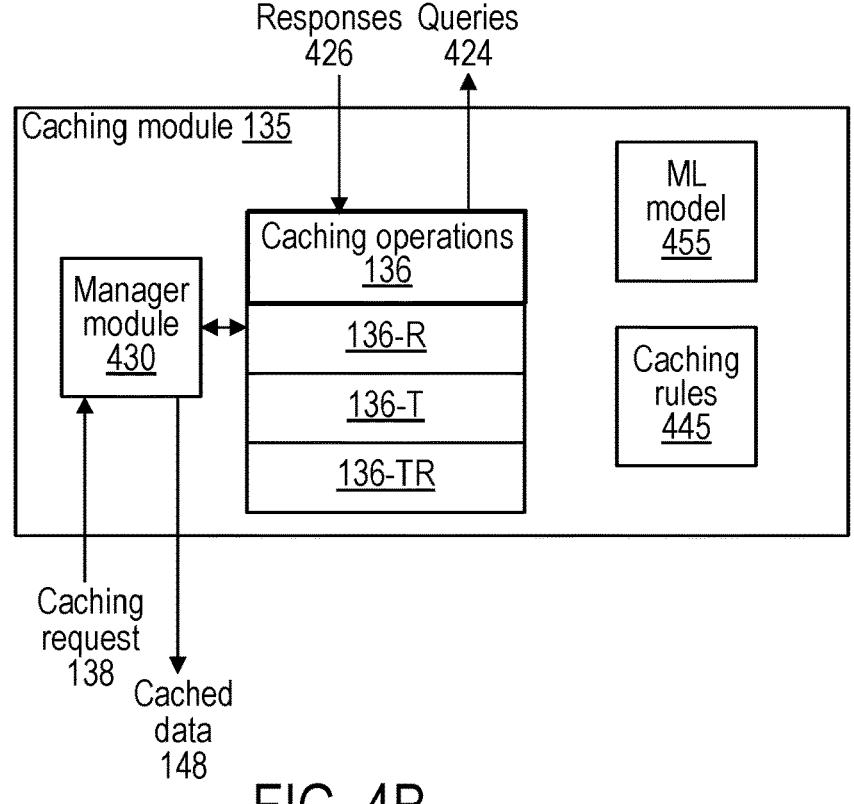
FIG. 4B is a block diagram that shows components of one embodiment of a caching module implemented on a server.
Figure 4C:
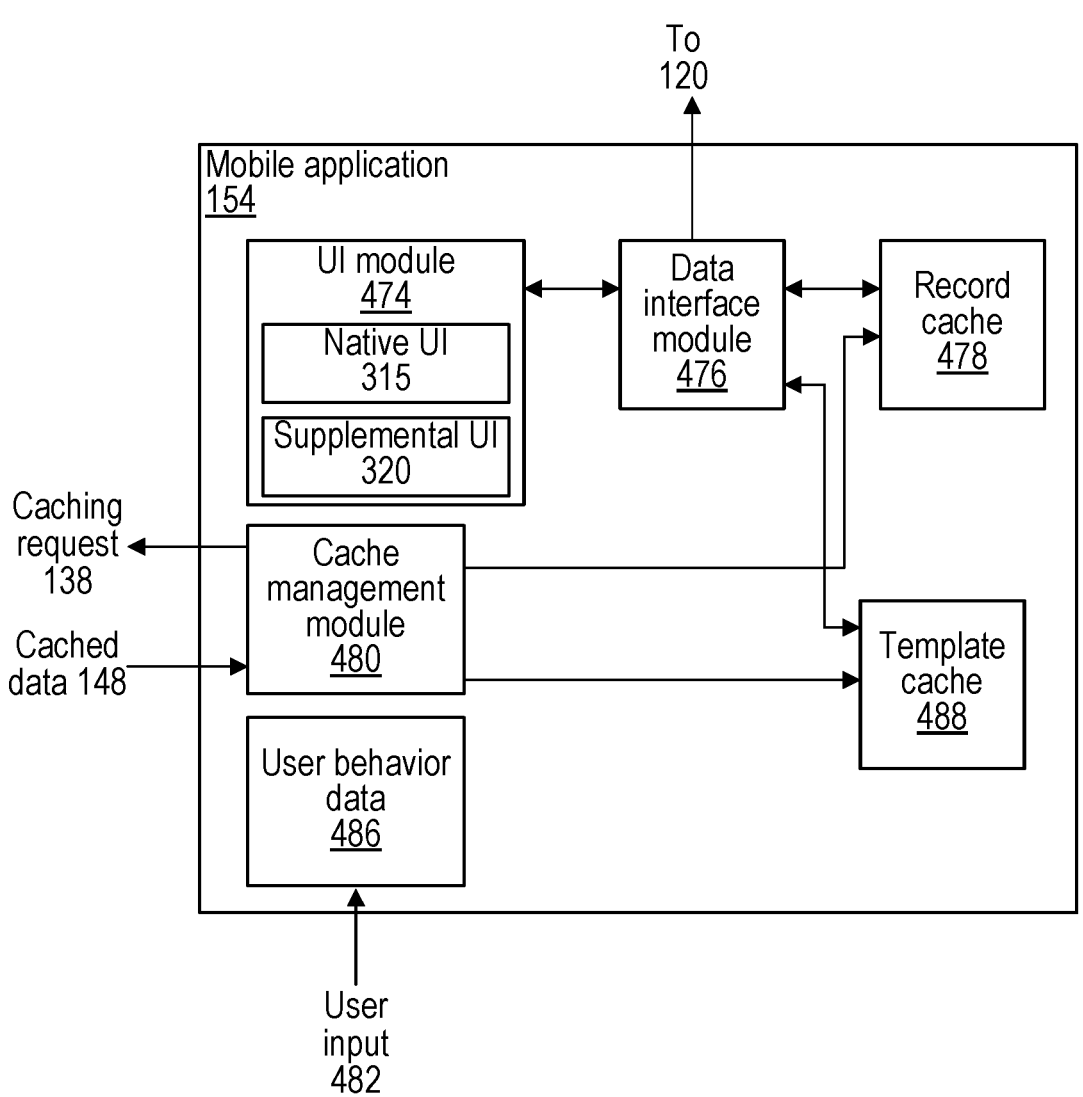
FIG. 4C is a block diagram illustrating components of one embodiment of a mobile application.

The caching approach disclosed herein can be implemented with components on both the server and client sides. FIGS. 4A-B depict block diagrams of one embodiment of the server-side architecture of a computer system 400. FIG. 4C, on the other hand, depicts a block diagram of the client-side architecture of mobile device 150 that is configured to execute mobile application 154 to communicate with server system 110 to render a UI in an online mode and to utilize cached data 148 to render a UI in an offline mode.

FIG. 4A is a block diagram of one embodiment of application 134, previously depicted within FIG. 1A. As shown, application 134 includes an input/output (I/O) controller module 410 and caching module 135. As shown, application 134 is executing within the context of application server 130. As used herein, an application server is any system that hosts an application, commonly for use by remote clients. In many cases, an application server is middleware that sits between users, an operating system, and external resources such as a database or other memory storage.

The portions of application 134 depicted in FIG. 4A can be used to highlight the difference between online and offline operation of mobile application 154 relative to UI generation. While mobile device 150 is connected to application server 130 (and thus online), mobile application 154 sends application calls 412 to module 410. These calls may trigger dB queries 415, which return records 416. Information in records 416 is returned to mobile application 154 as data 414. This pathway can provide data for both a native UI portion 315 and a supplemental UI portion 320.

To prepare for offline operation of mobile device 150, caching request 138 can be sent to caching module 135 in order to generate cached data 148 using database queries 424 and responses (e.g., records) 426. As noted, while caching request may come from mobile application 154, it may also come from a different entity. For example, consider a client that has a team of field service technicians. At some point in time (e.g., before the start of the work week), an administrative user of the client may cause different caching requests 138 to be issued for different members of its field service team. In this manner, different instances of cached data 148 for different technicians may be stored on server 110. When a particular technician then connects with server 110, that technician might receive an indication that a particular set of cached data 148 is ready for download to the technician's device. In this type of caching request 138, cached data 148 is not immediately stored to mobile device 150. In other cases, however, caching request 138 is submitted by mobile application 154, and cached data 148 is directly transferred to mobile device 150 in response to request 138.

FIG. 4B is a block diagram that provides more detail as to the internals of one embodiment of caching module 135. As has been described, caching module 135, in response to receiving a caching request 138, issues database queries 424 to database 120 and then uses the resulting records in responses 426 to create cached data 148. The cached data may subsequently be used by mobile device 150 to increase data completion during periods in which the device is offline.

As depicted, caching module 135 includes manager module 430 and caching operation module 136. In some embodiments, caching module 135 may also include caching rules 445 (which may encompass default rules 550 and custom rules 650 discussed below) and machine learning model 455. As its name suggests, manager module 430 manages the caching operation. As shown, module 430 receives caching request 138. In various embodiments, request 138 includes a number of parameters, including the identity of the user or device for whom the data is to be cached, as well as directives for the caching operations 136. These directives may specify that certain ones of caching rules 445 should be followed in the caching request, or which of caching operations 136 should be performed.

Figure 6:
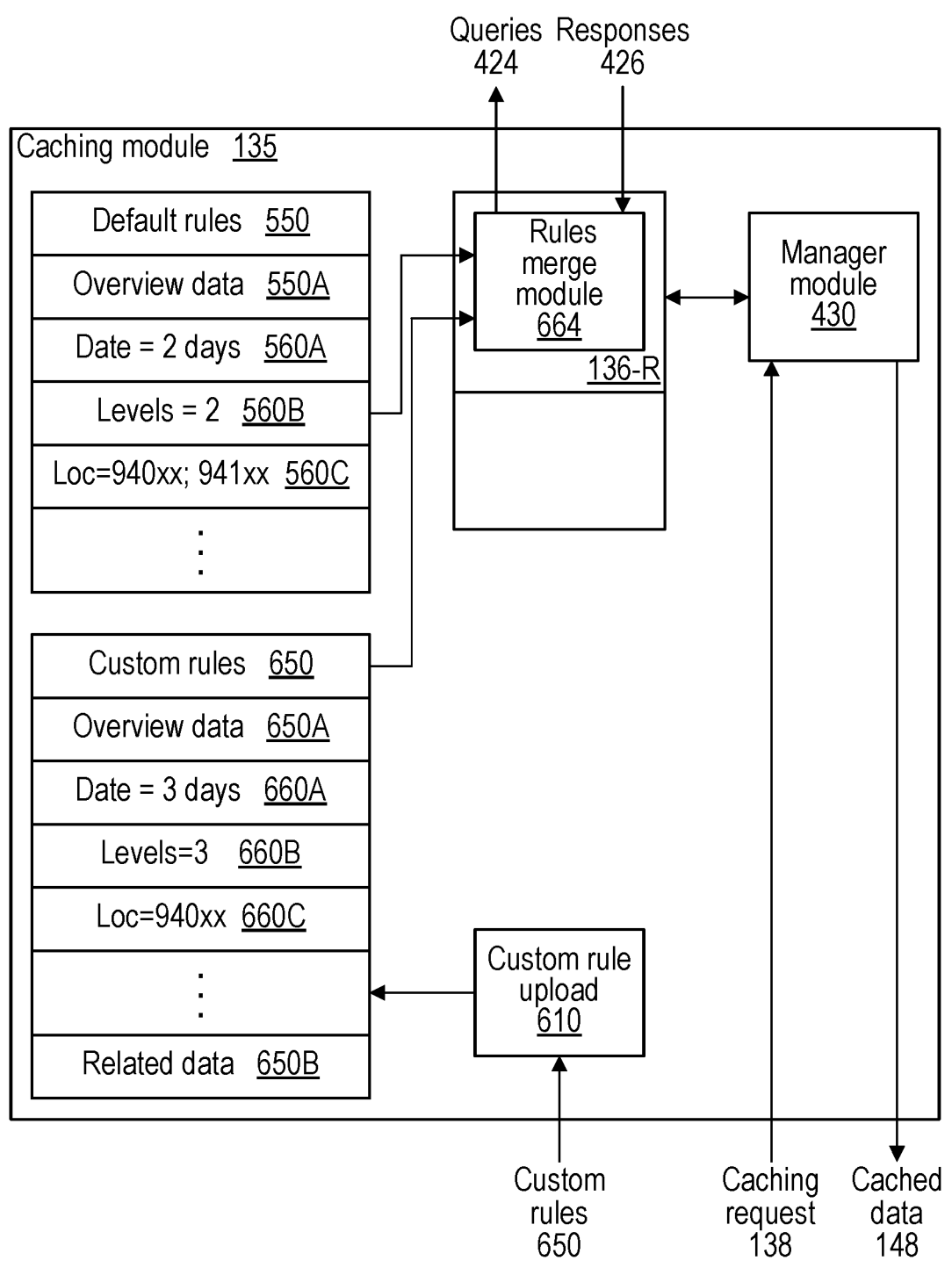
FIG. 6 is a block diagram of one embodiment of a caching module that permits the use of both default and custom record caching rules.
Figure 7A:
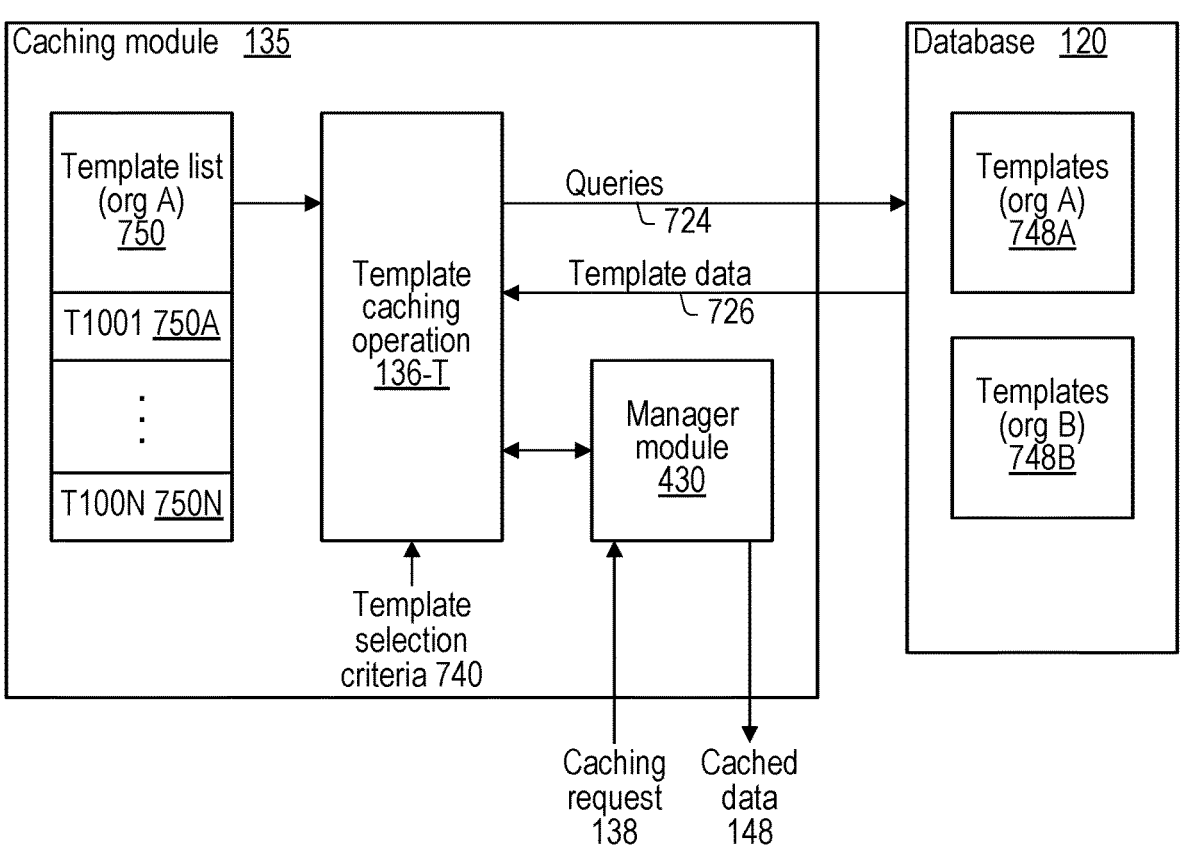
FIG. 7A depicts a block diagram of an embodiment of a caching module that performs a template caching operation.
Figure 7B:
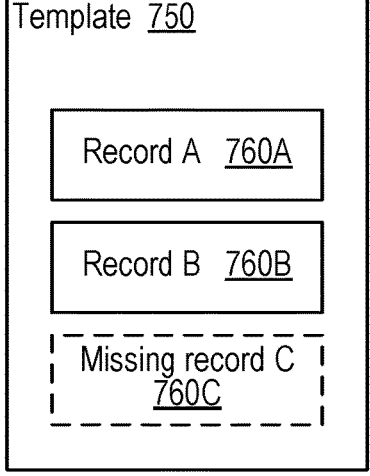
FIG. 7B is an example illustrating a potential problem of data incompletion after a template caching operation.

Manager module 430 may also orchestrate the execution of caching operations 136, including whether a particular caching operation should be performed, determining the order in which they should be performed, and whether rules within caching rules 445 should be utilized. In some cases, various caching operations may be performed in parallel. Further details on these caching operations are provided with respect to FIGS. 5A-B (default record caching, reference numeral 136-R); FIG. 6 (custom record caching, 136-R); FIGS. 7A-B (template caching, 136-T); and FIGS. 8A-C (template-record caching, 136-TR). As will be described with respect to FIG. 9, caching operations 136 may sometimes be performed using machine learning model 455. Accordingly, manager module 430 may call one or more sub-modules of module 436, which in turn issue queries 424 to database 120 and receive records in responses 426. These results are reported back to manager module 430, which returns cached data 148.

FIG. 4C is a block diagram illustrating components of one embodiment of mobile application 154. Depicted components include UI module 474, data interface module 476, record cache 478, template cache 488, cache management module 480, and user behavior data 486. Note that in other embodiments, various modules can be situated differently— for example, cache 478 may be located externally to mobile application 154.

UI module 474 refers to the portion of mobile application 154 that is responsible for rendering the UI on a display of mobile device 150. Module 474 is used to render portions of both native UI 315 and supplemental UI 320, both in online and offline modes. Rendering requests (e.g., requests for templates, records, etc., which may be made in response to user input 482) for the UI are sent to data interface module 476. If mobile device 150 is online, the rendering requests will be forwarded to application 134 executing within the context of application server 130 on server computer system 110. Module 476 will receive the resulting data and forward to module 474 for rendering.

If mobile device 150 is offline when a rendering request is made by module 474, then the request will be passed to record cache 478 or template cache 488 depending on the nature of the request. Two caches may be used since the format of the contents can be substantially different. Results from caches 478 and 488 are returned to data interface module 476 and then to UI module 474. Cache 478 can store records used by both native UI 315 and supplemental UI 320.

In the depicted embodiment, the actual caching of data is managed by cache management module 480. In instances in which a user initiates caching, module 480 sends caching request 138 to caching module 135, receives cached data 148, and causes it to be stored in data cache 478. Module 480 also handles the caching of data 148 when another entity causes the initiation of caching request 138.

Mobile application 154 can also collect and store user behavior data 486, which is indicative of selections made as a part of user input 482. For example, data 486 might indicate what reports or UI screens that a particular user selects and the frequency of such selection. As will be described, data 486 can be used to help train a machine learning model such as machine learning model 455. Once trained, model 455 can be used in certain embodiments to select which records and/or templates should be selected for caching via operations 136-T and 136-TR.

Caching Operations

The first type of caching operation to be discussed in more detail is default record caching. The premise of this type of caching is that records that correspond to known portions of application 310 (in particular, native UI 315 portions) are very likely to be accessed to users of mobile application 154. Accordingly, it makes sense to perform some default caching so that the likely-to-be-accessed UI portions have some default amount of data to display.

Figure 5A:
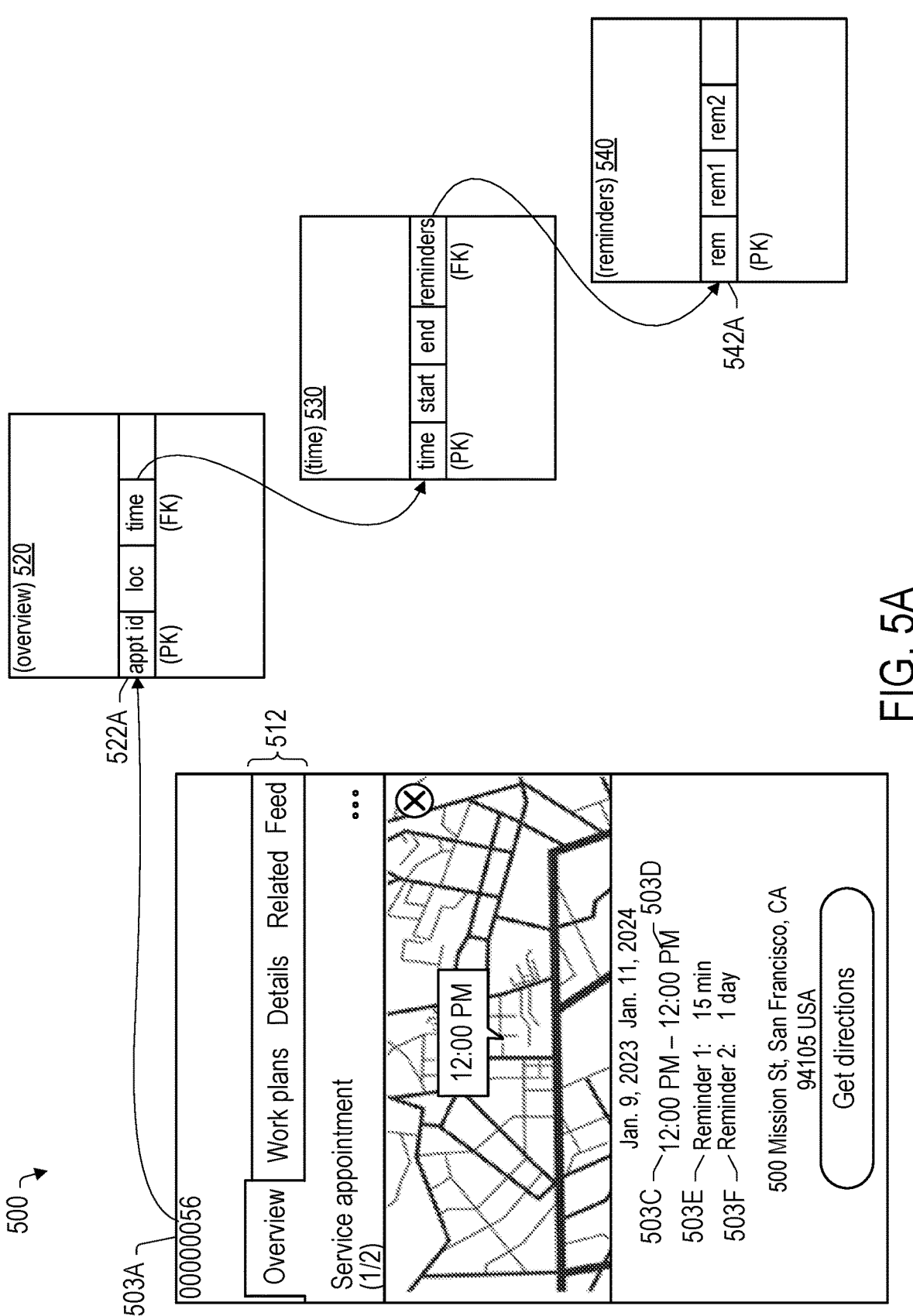
FIGS. 5A-B illustrate the use of default record caching for a mobile application.

Consider FIG. 5A, which depicts a screen view 500 within a native UI portion 315A, as well as associated database objects 520, 530, and 540. Screen view 500 displays a number of fields 503 associated with the "Overview"

object, which corresponds to database table 520. Fields 503 include appointment ID (identified by reference numeral 503A), location address (503B), appointment start time (503C), appointment end time (503D), reminder 1 (503E), and reminder 2 (503F). Screen view 500 also includes links 512 to other screens in the UI, where these other screens ("Work Plans," "Details," "Related," etc.) correspond to other database objects. These other screens may contain more detailed information about the appointment. For example, the "Related" screen may contain links to appointments that have similar information (e.g., same customer, same zip code, etc.).

When mobile device 150 is online, screen view 500 will fully render, as each of the fields exhibits data completion. In a manner similar to FIG. 2B, the data for fields 503A-F may require accesses to several levels of database objects within a hierarchy. Appointment id 00000056 in field 503A can be used as a primary key to index into overview table 520. Record 522A in this table includes a value in the location column which stores the value for field 503B. The address location value can thus be obtained with one level of database access (n=1).

Record 522A also includes a "time" foreign key that can be used to index into record 532A in time table 530. This record includes appointment start and end times, which can be used to populate fields 503C-D. The appointment times can thus be obtained with two levels of database access (n=2). Record 532A also includes a "reminder" foreign key that can be used to index into record 542A within reminder table 540. This record includes the intervals at which reminders 1 and 2 will be issued to the user. These values can be used to populate fields 503E-F. The reminder values can thus be obtained with three levels of database access (n=3).

Because the UI portion on which screen view 500 is based is part of a native UI 315, it seems likely that a typical user would want to have at least some records associated with this screen. Accordingly, the default recording caching operation can cause some number of records from the overview table to be cached and thus available for offline use. But depending on how the default caching is defined, screen view 500 may not be fully rendered for certain records when offline.

One example of a caching rule that would lead to data incompletion for screen view 500 is caching of records from table 520, but with only 2 levels of access. In this instance, default caching would include returning some number of records from table 520, but with only one additional level of database fetching permitted (i.e., n=2). Under this restriction, caching could obtain the appointment location (503B) from table 520 and the appointment start and end times (503C-D), but not the reminder intervals (503E-F). Another example of a restriction that could result in data incompletion for screen view 500 is a time limitation on how many records from table 520 are retrieved. This means that screen view 500 would fully render for certain records, but not others that were out of this date range.

The use of default caching rules is a broad policy that is applied to all users of mobile application 154. Causing records to be cached that are associated with certain UI screens of the native application can provide great benefits, but is by no means a comprehensive solution (and it is not intended to be). Nonetheless, record caching operation 136-R provides a starting point for caching records for offline use.

Figure 5B:
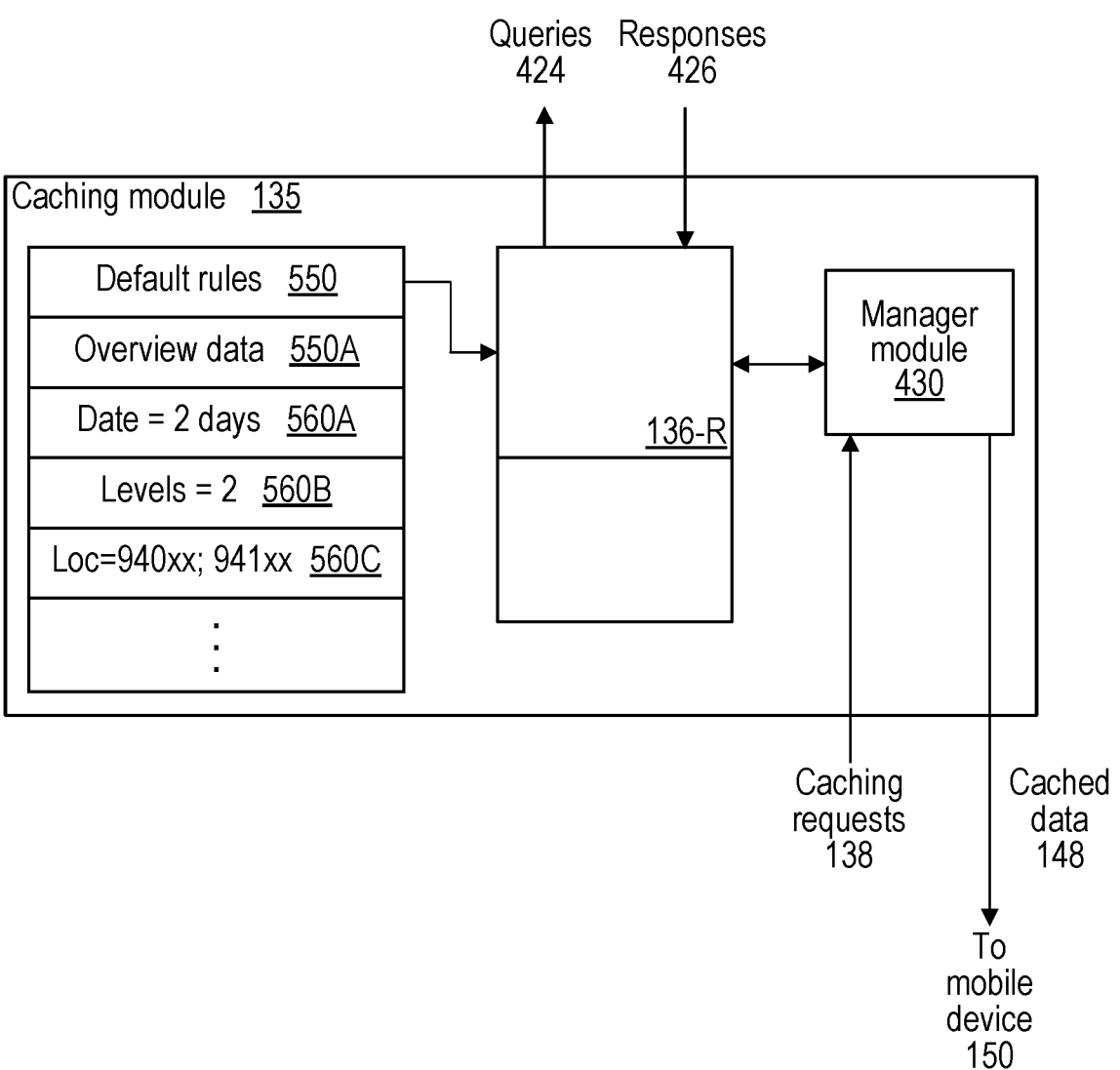

FIG. 5B is a block diagram of one embodiment of caching module 135 and mobile device 150 implementing default record caching. Caching module 135 includes manager module 430, which receives caching request 138, and caching operations module 136, which include a sub-module that performs record caching operation 136-R and communicates with database 120. As shown, sub-module 136-R receives input from default rules 550, and formulates queries 424 to database 120 that implement rules 550. Sub-module then receives responses (i.e., records) 426 that are responsive to these queries, and returns these results to module 430, which are included as default record data 560 within cached data 148. Mobile device 150 ultimately receives cached data 148 with default record data 560, which allows offline data completion for any data fields in any screen of the UI of mobile application that reference default record data 560.

Default rules 550 are designed to cause data to be cached based on certain assumptions about what types of data an average organization will need when using mobile application 154. These rules are specified by the software provider and are not modifiable by clients. As has mentioned, a starting point for the default rules is to tie them to information that is viewable through various screens of the native mobile application 154 (the various versions of which should generally all permit the same types of data to be viewed).

As one example of a default caching rule, consider screen view 500 shown in FIG. 5A, which shows appointment overview data. Given that there is a screen for this data in mobile application 154, it follows that users would likely want to access data on this screen view offline. Accordingly, default rules 550 includes rule 550A, which causes overview data to be cached. Additionally, rule 550A includes several parameters 560A-C that restrict the scope of the caching of overview data. Parameter 560A restricts overview data caching to the next two days (date=2); parameter 560B restricts record dependency calls to two levels; and parameter 560C restricts caching to certain zip codes (940xx and 941xx).

These parameters reflect the reality that it is impractical to cache all record data, and thus some restrictions on this data are inevitable. But this also means that some users might experience data incompletion in certain cases, even for screens in the native UI. The restrictions of parameters 560A-C, for example, will lead to certain data not being cached. Parameter 560A will cause data incompletion when a user desires to view overview data that is later than two days out; parameter 560B will cause data incompletion for reminder data on records in certain date ranges; while parameter 560C will cause data incompletion for zip codes other than those specified.

Apart from these restrictions, remember that default rules 550 are typically tied to the types of data viewable through the native version of mobile application 154. Accordingly, data incompletion is likely to be higher for supplemental portions of the UI that have been tailored to particular clients' business needs. (But default record data 560 that is cached as a result of default rules 550 is available to both native and supplemental UI portions.) Default record caching thus provides a baseline of data that is available for offline applications, albeit one that is not customized in any way to individual mobile applications, some of which have extended user interfaces and functionalities.

In sum, default rules 550 are set by the software provider and are based upon several assumptions about the average's organization behavior. They are not directly modifiable by the organization even when several organizations may find use in records not cached by default.

The next type of caching operation to be discussed is custom record caching. Given the one-size-fits-all approach of default record caching, the inventors have recognized that there is a need for customized record caching that can supplement and/or override default rules.

FIG. 6 is a block diagram one embodiment of a caching module that permits the use of both default and custom record caching rules. In addition to the elements introduced in FIG. 5B, caching module 135 contains custom rules 650 and custom rule upload module 610. Note that this diagram depicts custom rules 650 for a single organization. While not depicted, caching module 135 can store multiple sets of custom rules for different organizations. In contrast, the default rules 550, as they have been described, are identical for all organizations or some group of organizations.

Custom rules may be specified and uploaded to module 610, which provides an interface for an organization or users of an organization to define and/or submit a set of custom rules 650. A particular set of custom rules may be applicable for all users of an organization, some subset of users of the organization, or even a single user. Some users, for example, may prefer to have more information than other users in the organization, and may themselves create a personalized custom rules package. Conversely, an organization may specify a set of custom rules for all of its users.

In some cases, a given custom rule may no conflicts with the default set of rules. For example, custom rule 650B causes records from the "Related" data link in screen view 500 to be cached. Default rules 550 do not have any similar rule directed to caching related records data. Thus, rules 650 may be used to introduce additional records to be cached that were not initially covered by default rules 550, allowing users and organizations to accommodate their own needs that are unmet by default rules 550.

In other cases, custom rules 650 may be directed to records already set to be cached by default rules 550. Consider custom rule 650A which, like default rule 550A, is directed to overview data. Custom parameters 660A-C, however, conflict with their corresponding default parameters 560A-C. That is, the application of custom parameters 660A-C results in a different amount of overview data being cached relative to the application of default parameters 560A-C. For example, parameter 660A expands the caching of overview data records from the next two days (date=2 in 560A) to the next three days (date=3). Parameter 660B expands record dependency calls from two levels (levels=2 in 560B) to three levels. Finally, parameter 660C restricts caching to only zip codes 940xx instead of zip codes 940xx and 941xx in 560C. Accordingly, custom rules 650 can either increase or decrease the size of the set of record data cached by module 136-R relative to the default rules. Note that custom rules may also be used in cases where no default rules are set.

Similarly, one custom rule (not depicted) might state that no default caching rules are to be applied and only custom rules are to be followed. Alternatively, manager module 430 may select which of rule sets 550/650 are considered to be valid inputs to caching operation 136-R. If both rule sets 550 and 650 are both active for a given record caching operation, rules merge module 664 can be used to resolve any conflicts between the rule sets. Thus, custom rules such as rule 650A and associated parameters 660A-C would override default rule 550A and associated parameters 560A-C. Rule 550A would thus be replaced by rule 560A in this example.

With merged rules set by rules merge module 664, record caching operation 136-R interacts with database 120 by issuing database queries 424 that request records according to the merged rules. Record caching operation 136-R then receives responses 426 and subsequently sends them to manager module 430, which in turn includes the retrieved records with other retrieved records as cached data 148.

Custom rules 650 thus provide more flexibility and permit the caching of the amount of record data deemed necessary by different organizations. But while default and custom record caching provide a starting point for record caching for both native and supplemental UI portions, the inventors have recognized that these techniques do not fully address issues relating to caching of information displayed via supplemental portions 320 of mobile application 154. In particular, the record caching techniques discussed to this point are not concerned with template caching. Thus, with only the record caching techniques, the selection by an offline user of a portion of the UI of mobile application that is based on a template will result in an error, a program hang (e.g., a "program loading" icon), or some other undesirable outcome. Furthermore, the techniques discussed thus far do not guarantee data completion for all particular instances of templates and records. Caching techniques that address these issues are discussed next, relative to FIGS. 7-9.

FIG. 7A depicts a block diagram of one embodiment of a caching module that performs a template caching operation. As shown, caching module 135 includes template caching operation sub-module 136-T, manager module 430, and a template list 750. Caching module 135 receives caching request 138, template selection criteria 740, and template data 726 from database 120; module 135 also sends queries 724 to database 120. Database 120 contains templates 748A-B for various organizations, including organizations A-B.

Templates 748 stored in database 120 are typically associated with the organization that created them: templates 748A contains all template data (e.g., graphical elements, text elements, code 220) associated with organization A, and template 748B similarly contains all template data associated with organization B. Each template may include metadata such as a template id as described above. In various embodiments, a given record associated with a supplemental UI portion is associated with a corresponding template—for example, a given record may include a template id field that can be used to identify the corresponding template in database 120.

Conceptually, template list 750 identifies all templates (denoted by list entries 750A-N) that are to be cached for a particular organization. Collectively, for example, the list may point to templates 748A for organization A. List 750 may be obtained in several ways. For example, a developer may maintain list by tracking all active templates being used by an organization (e.g., created by administrators of an organization, added by users, etc.) But in other embodiments, a set of seed records could be specified and template list 750 could be generated from determining what templates are accessed by those records. Compilation of templates and records is discussed in more detail with respect to FIGS. 8A-B.

Template selection criteria 740 specifies any restriction on the number and properties of templates cached by template caching operation 136-T. In some cases, criteria 740 simply defaults to caching all templates for a particular organization or user within an organization. In other cases, some proper subset of templates may be cached. For example, an organization might desire to limit template caching based on a user type (technician/supervisor). Still further, template selection criteria 740 may also be specified by the result of a machine learning model, as will be discussed with respect to FIG. 9. In this manner, template selection might be based on past user behavior and other factors.

In one embodiment, template caching operation sub-module 136-T uses template list 750 to cache each template in the list. For each template in list 750, caching operation 136-T renders (e.g., using an HTML engine) a supplemental UI page that uses the template. This rendering process may be accomplished in multiple ways. In some implementations, a template might be rendered without accessing a sample of a record referenced by the template. This rendering would still cache the various static elements of the template (e.g., graphics, text) that are common to all instances of the template. In other implementations, caching operation 136-T renders a template-record pair—that is, rendering the template with at least one record referenced by that template (even though the template might reference additional records). In still other implementations, caching operation sub-module 136-T renders a template with at least one instance of all records included in that service order. Caching operation 136-T then proceeds to the next template in list 750 until the indicated number of templates (that is, those templates identified by template selection criteria 740) have been cached. The cached templates and any associated records are passed to manager module 430, which includes this information in cached data 148.

In these various implementations of caching operation 136-T, different amounts of associated record data may be cached along with the templates. In the first implementation discussed in the preceding paragraph, no record data is cached along with a particular template. In the second implementation, one record is cached along with a particular template. In the third implementation, one full set of records associated with a particular template is cached (e.g., if a template references records A, B, and C, three records for a particular instantiation of the template are cached). Note also that there may be some caching of dependent records as well. But while some record data may be collaterally cached as a result of template caching operation 136-T, there is no guarantee of data completion of a particular template relative to all potential records that might be accessed by that template while mobile application 154 is in use while offline.

An exemplary result of record caching operations and template caching operation that illustrates the data incompletion issue discussed above is illustrated briefly in FIG. 7B. Consider template 750, which includes data fields for three records: field 760A (linked to record A), field 760B (record B), and field 760C (record C). When an instance of template 750 is to be rendered (e.g., a service order work flow for a particular client), a remote, offline user will expect data completion for each of the three fields 760A-C.

Suppose a record caching operation 136-R and a template caching operation 136-T have been performed, but not template-record caching operation 136-TR. At this point, some data records have been retrieved as a result of caching operation 136-R, but nothing in this operation guarantees data completion for an entire template, which will commonly have data fields tied to different kinds of records. Stated another way, caching operation 136-R will fetch all records specified by the caching request, but does not operate to ensure that particular combinations of record types needed by templates are also fetched. Indeed, caching operation 136-R does not deal with caching templates at all. This is the job of caching operation 136-T. Performing operations 136-R and 136-T thus ensures that some records will be cached and all needed templates will be cached. One possible result is shown in FIG. 7B: there is data completion for fields 760A-B, but not for field 760C. The fact that two fields are data-complete in this example may be due only to happenstance. In some cases, none of fields 760A-C may be data complete. The goal of data completeness for templates is the subject of template-record caching, which is described next.

Figure 8A:
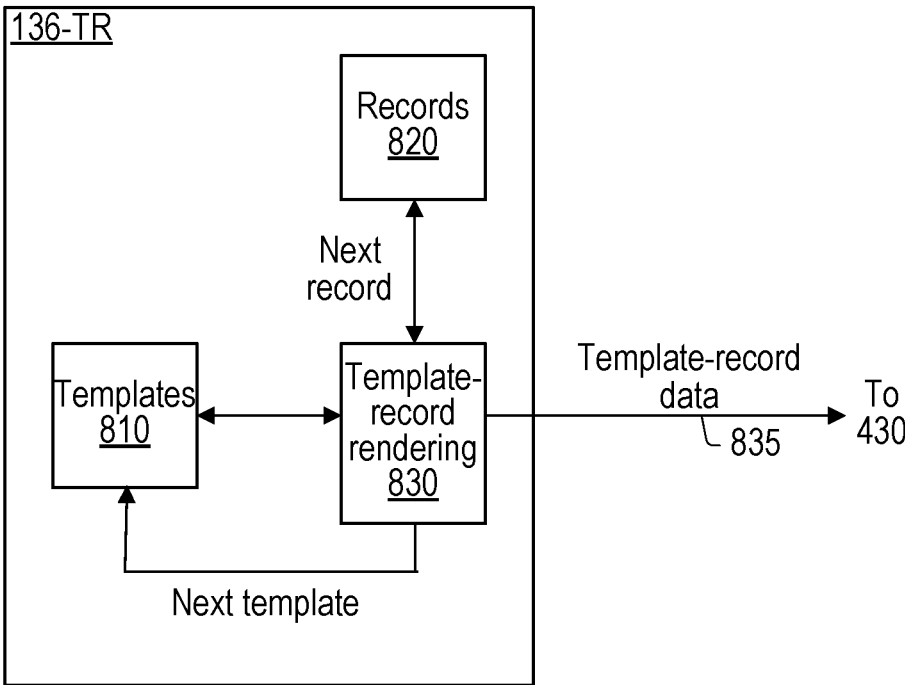
FIGS. 8A-C illustrate examples of a template-record caching operation.

FIG. 8A is a block diagram of one embodiment of a sub-module 136-TR that implements a template-record caching operation. Sub-module 136-TR includes template-record rendering process 830, which takes templates 810 and records 820 as inputs. Although these elements are shown as being located within sub-module 136-TR, they may be accessed from an external location such as database 120 in some embodiments. Rendering process 830 produces template-record data 835, which is provided to manager module 430. Sub-module 136-TR may also be managed by manager module 430 (e.g., module 430 may determine whether sub-module 136-TR operates in a particular case).

As previously discussed, a goal of the disclosed techniques is to ensure offline data completion for any combination of a set of templates and an associated, user-defined set of records that are referenced by those templates. The set of templates for a particular organization is typically of manageable size, but the number of potential records that populate those templates might be quite large, especially in enterprise applications. As one common restriction, the scope of the records may be time-limited and/or location-limited to prevent caching of too many records, thus avoiding running afoul of the physical storage constraints of mobile devices.

To achieve this goal, sub-module 136-TR uses a set of templates 810 and a set of records 820 to cache sufficient data to guarantee offline data completion for each potential combination of templates 810 and records 820. This process assures that users of mobile application 154 will have offline access to all needed data. The method of determining sets 810 and 820 can vary. Two possible implementations of sub-module 136-TR are now described.

In a first possible implementation, sub-module 136-TR begins with a list of templates 810 (which have been selected by template selection criteria 740 in some embodiments). For each template in templates 810, the template-record caching operation begins by determining a first record type referenced by the template. Sub-module 136-T then renders that template-record pair, and then proceeds to render all records of that same type (e.g., service work orders) in the set of records 820. This process may include dependency checking; thus, if one record referenced by a template has a data value that depends on another record, that other record is also cached. Operation 136-TR can then proceed to the next record field in the template and repeat the same rendering process. This process continues until a particular template has been rendered with respect to all relevant records in set 820. The rendered data is all included in template-record data 835. The process then continues with the next template in set of templates 810. Accordingly, if an accurate list of templates is available, those templates can be crawled to determine all record types that should be fetched to ensure offline data completion.

An alternative implementation of sub-module 136-TR instead starts with a "seed" list of record types in records 820 that are commonly found across all templates and that exhibit some limiting parameters (time and/or location). Examples of these seed record types for a field service use case include service appointment records, work order records, and work order line-item records. These seed records can then be cached along with any dependent records. Because each record is linked to a particular template in one implementation, sub-module 136-TR can generate set of templates 810 by including all templates that are referenced by the seed records. Operation 136-TR can then traverse the set of templates as described above to discover any remaining record types that have not already been cached. This approach relies on an assumption that common record types will link to all desired templates. Once the desired set of templates is found, all records referenced by those templates that have not already been accessed can be cached.

By employing these or other suitable implementations, offline data completion for a set of specified templates and a set of specified records can be ensured. Accordingly, a given supplemental portion of a UI within the specified time window can be rendered offline in a satisfactory manner.

Figure 8B:
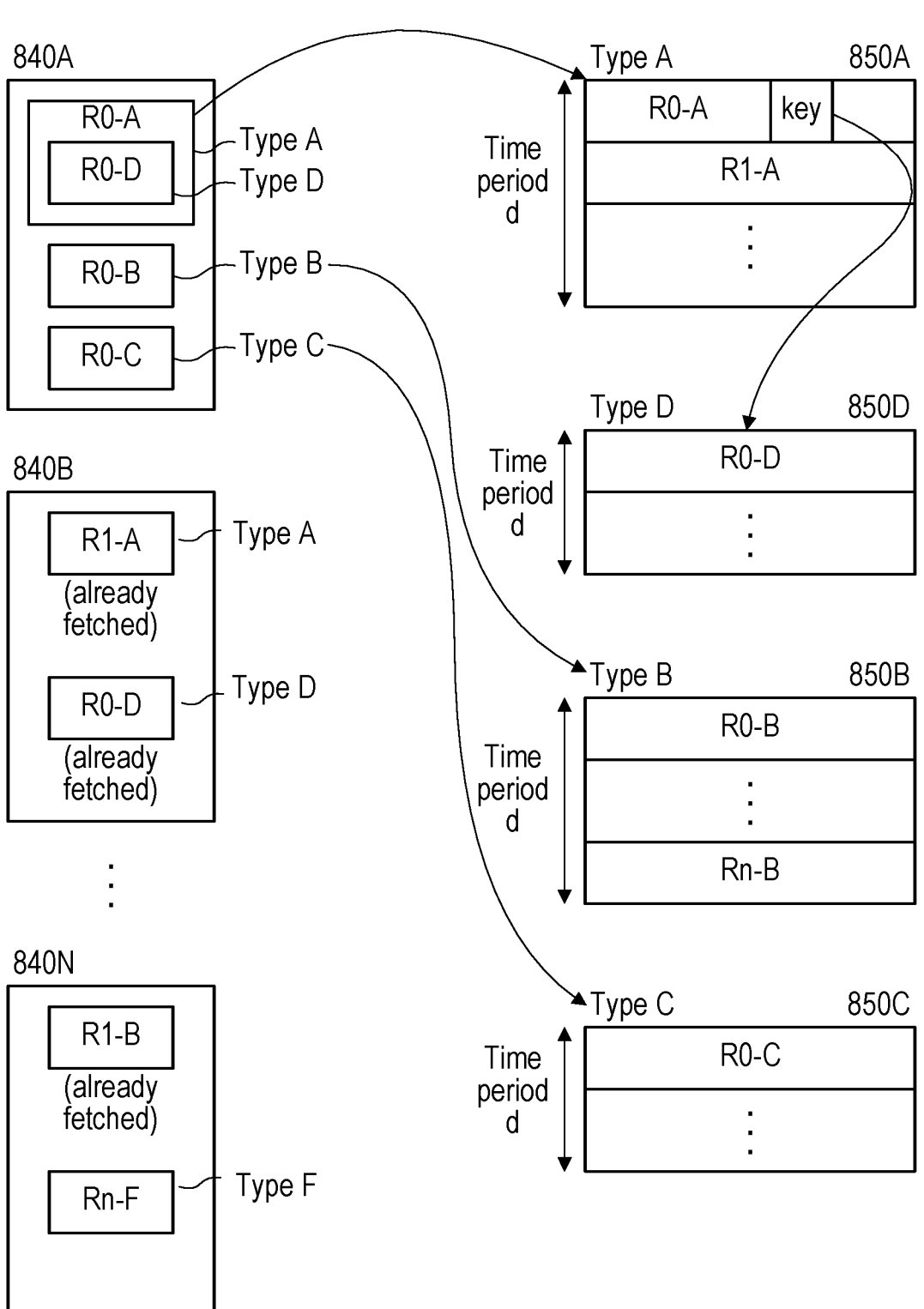

FIG. 8B is a block diagram illustrating an example record-template caching operation 136-TR. This example depicts templates 840A-N, which have various records of different types (e.g., types A-F). Some records (e.g., R0-A of type A), have dependent records (e.g., R0-D of type D). In this example, the records in tables 850A-D all have a time value that is within some specified time period d (e.g., 2 days).

At the outset of record-template caching operation 136-TR, template 840A has previously been cached by operation 136-T, which means that all graphical data, textual data, etc. of the template has been cached. Then record type A is discovered with template 840A. All records of type A in set of records 820 described above can then be fetched and cached. As has been explained, set of records 820 may be time-limited and/or location-limited, etc. As part of caching records of type A, corresponding dependent records of type D are also cached, since one value referenced in table 850A can only be resolved by accessing table 850D. Operation 136-TR continues with the remaining records types referenced by template 840A (R0-B of type B and R0-C of type C).

After caching is complete with respect to template 840A, operation 136-TR continues with caching template 840B. As both record types A and D were already cached by caching template 840A, there is no additional data to fetch. Various methods may be used to determine what types of records have already been cached in order to avoid re-caching and wasting bandwidth to database 120.

Operation 136-TR continues processing templates until reaching the last template in the set of templates (840N). At that point, all record types have already cached by virtue of being referenced in previous templates (e.g., Rn-B in template 840N), or will be cached as part of processing the last template (e.g., Rn-F in template 840N).

At the conclusion of operation 136-TR, because all specified records have been fetched for the desired templates, offline data completion is guaranteed within the universe of these records and templates.

Figure 8C:
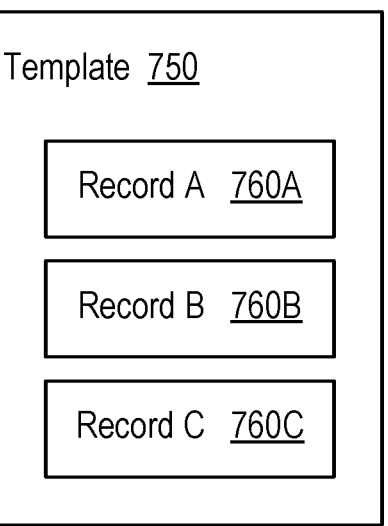

FIG. 8C illustrates data completion for template 750, previously described relative to FIG. 7B, after performing a template-record caching operation. In FIG. 7B, template 750 exhibited data completion for fields 760A-B, but not for field 760C. As described above, template-record caching iterates over each template in order to determine the nature of the types of records referencing in each template. Some number of records of those types (e.g., a time-delimited value such as two days' worth of records) are then fetched. Each template-record pair can thus be rendered and cached within cached data 148. This guarantees that when an offline user selects a UI portion based on template 750 that references some particular set of records A, B, and C, that template and data fields will fully render.

Note the differences in the use of some implementations of template caching operation 136-T and template-record caching operation 136-TR. The former operation may be used to cache all templates for an organization, while the latter operation may cache just those templates associated with a certain set of records (e.g., those within some time period). Thus, one implementation of 136-TR might, for one record R, cache one template (e.g., template A). Operation 136-TR, however, may not cache other templates B and C if they are not associated with the set of records being worked with offline. Without operation 136-T (which would, in various implementations, cache templates B and C), a future request to view record R with templates B and C would not be data-complete.

The preceding discussions of template caching operation 136-T and template-record caching operation 136-TR have made certain assumptions as to the number of templates and records for which to guarantee data completion. For example, all templates for an organization may be selected by caching operation 136-T, and all records of particular types within a particular time can be used to perform template-record caching operation 136-TR. But in other embodiments, a machine learning recommendation for selecting templates and records can be employed.

Machine Learning Recommendations

Figure 9:
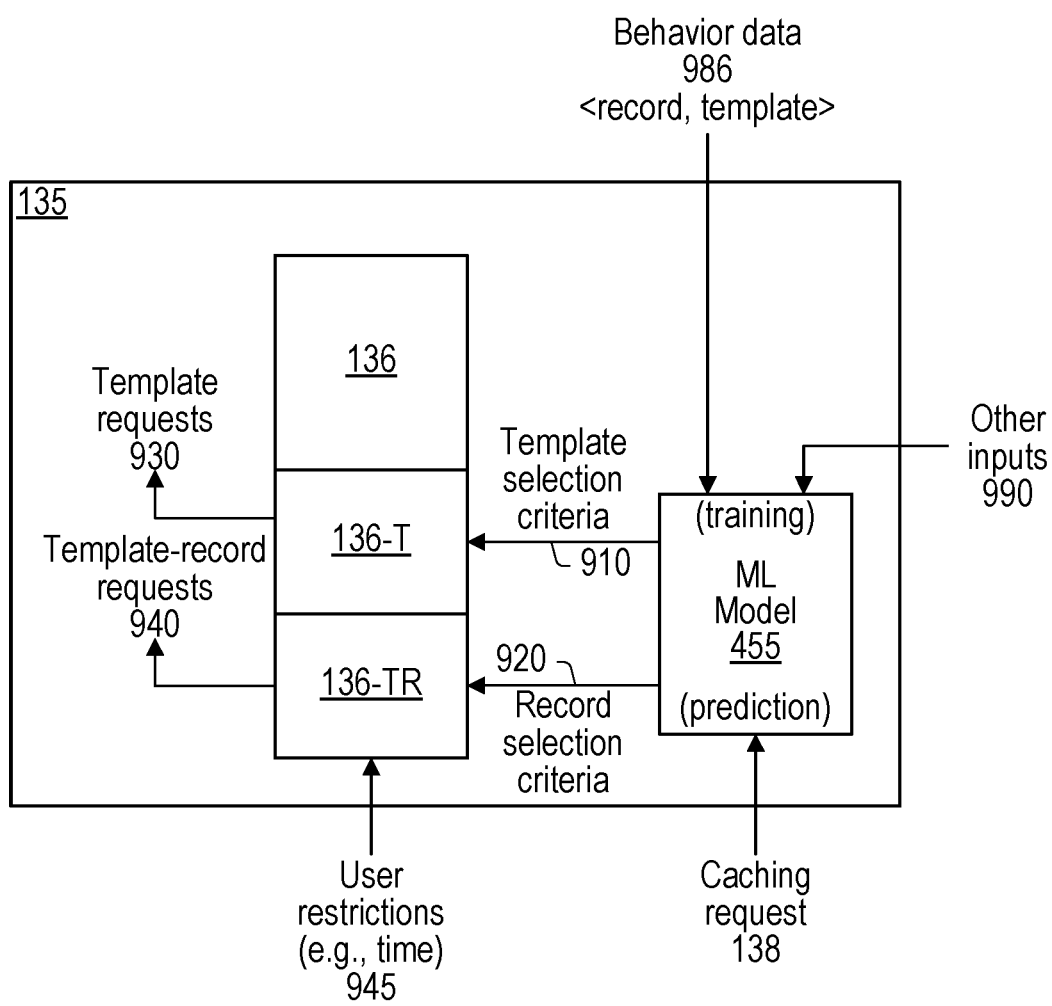
FIG. 9 is a block diagram of one embodiment of a caching module that employs recommendations from a machine learning model.

FIG. 9 is a block diagram of one embodiment of a caching module that employs recommendations from a machine learning model. Caching module 135 includes caching operations module 136, which includes sub-modules 136-T and 136-TR that have been previously discussed. Additionally, caching module includes machine learning model 455, previously referenced in FIG. 4B.

The premise behind the embodiment of FIG. 9 is that various inputs, including user behavior, can be used to recommend the most appropriate set of templates and records for caching. In some cases, this may lead to a smaller set of templates and records being cached, while in other cases, a larger set of templates and records may be cached.

In certain embodiments, user behavior may be tracked to determine, for example, what portions of a UI of mobile application 154 are selected by a particular user or users. For example, a technician's selection of a particular report to display to a customer can constitute behavior data. In some implementations, the format of the behavior data may be the record and the associated template for the report or other selection. This particular user behavior can be referred to as selection of a "report-generating command." This behavior information may be stored on mobile device 150 and periodically reported back to server system 110 as user behavior data 986. Frequency of selection of UI content can also constitute another form of user behavior information.

This user behavior information may be used to train machine learning model 455. In some implementations, model 455 may be trained based on user behavior for all users in an organization, while in other implementations, model 455 may be trained specifically for a particular user based on that user's behavior.

Once trained, machine learning model 455 can be used to generate a recommendation for which templates and records to use as the starting points for operations 136-T and 136-TR. The model may take into account a variety of factors, such as time taken by a particular user on various tasks, etc. Other inputs 990 may also be supplied to model 455 including the user for whom cached data 148 is to be generated, user location, and the like.

The output of machine learning model 455 can be one or both of template selection criteria 910 and record selection criteria 920. Template selection criteria 910 indicates which templates should be caching candidates using operation 136-T; this can be less than all templates for a particular organization in some instances. Similarly, records selection criteria can indicate what types of records should be caching candidates as part of operation 136-TR.

As shown, an additional input to sub-module 136-TR is user restrictions information 945. This information is usable to limit the universe of records for which data completion with the selected templates is guaranteed. One common example of this is a time restriction; a user may specify that only records within a certain time window (e.g., the next two days) are to be used in operation 136-TR. The result of input 945 in conjunction with selection criteria 910 and 920 is that the specified set of records and selected template data used in operations 136-T and 136-TR are those templates and records recommended by the machine-learning model 455 that also meet some set of user restrictions 945 (e.g., a time value within a specified time range). The templates that satisfy selection criteria 910 and user restrictions 945 are then requested from database 120 via template requests 930. Similarly, the records that satisfy selection criteria 920 and user restrictions 945 are requested from database 120 via template-record requests 940. In this manner, only the records and template deemed most relevant are cached.

In some embodiments, the output of machine learning model may not immediately affect operations 136-T and 136-TR. Rather, the recommendations from model 455 may be supplied to a supervisor or other administrative user. In this manner, caching recommendations may be reviewed before being implemented.

Example Methods

FIG. 10 is a flow diagram of one embodiment of a method 1000 for performing template and record caching. Method 1000 may be performed for example by server system 110. Method 1000 is susceptible to numerous variations, some of which are noted below.

Method 1000 begins in 1010, in which a computer system (e.g., server 110) operates an application server operable to handle calls made from a remotely executing application (e.g., mobile application 154). The mobile application has a user interface based at least in part on a set of templates (e.g., supplemental UI portion 320). In 1020 and 1030, the computer system stores, in a database, record data and template data for the set of templates.

A given one of the set of templates (i.e., any template selected from the set of templates) specifies data fields for that template. Furthermore, a given template is fully renderable by the application, while executing on a mobile device that has a network connection to the application server, by populating the specified data fields with record data from the database. In general, a particular template-record pair will be fully renderable by the mobile application when the mobile device is online. Whether or not the template-record pair is fully renderable while the mobile device is offline is a function of the caching operations that are performed by later portions of method 1000.

Steps 1010, 1020, and 1030, are performed on an ongoing basis and prior to 1040, in which a request to cache data for the mobile device is received. In 1050, in response to the request, a set of caching operations a performed to cache data for offline use for the mobile application. The set of operations includes a template caching operation that causes selected template data to be cached. The set of operations also includes a template-record caching operation that causes a set of record data to be cached such that templates for the cached selected template data will fully render for a specified set of records when the mobile device does not have a network connection to the computer system (i.e., when the remote device is offline).

In some instances, the record data and the template data are data of a particular one of a plurality of organizations whose data is managed by the computer system (e.g., the organization is a field service company that uses the SALES-FORCE field services cloud product). In such a scenario, the user interface may have a native portion that is common to all organizations. The user interface may also have a supplemental portion that is customized for the particular organization, where the set of templates are part of the supplemental portion (that is, the set of templates specify the framework of UI portions in the supplemental portion). (Note that the native and supplemental portions of the user interface may be programmed using different programming languages.) In such instances, the template caching operation and the template-record caching operation ensure data completion for the selected template data and the specified set of records within the supplemental portion of the user interface. In other words, the template caching operation and the template-record caching operation are performed so that each of the templates corresponding to the selected template data will fully render while offline for each of the specified set of records.

The set of caching operations may include other operations. For example, the set may include a record caching operation that caches records according to a default set of rules that apply to all versions of the application (i.e., the default set of rules applies to all of the plurality of organizations and thus to all different versions of the application that have been modified/extended by those organizations). In some cases, an organization such as the particular organization (or other entity) may also specify a custom set of rules for that organization or user within an organization. These rules may override any conflicting rules in the default set, such that the record caching operation is performed according to the default set of rules as modified by the custom set of rules.

The scope of the template caching operation and the template-record caching operation can be set in various ways. For example, the selected template data may be the total number of templates in the supplemental portion of the user interface for the particular organization. Alternatively, some subset of the total number of templates may be selected (e.g., based on a machine learning recommendation). The specified set of records are those records of a particular set of types (e.g., Overview records, Related records shown in screen view 500) having time values within a specified time range (e.g., within the next two days).

In order to ensure data completion, the template-record caching operation may include crawling the specified set of records to identify data dependencies and caching any additional records indicated by the identified data dependencies to ensure that templates for the cached selected template data will fully render for the specified set of records when the mobile device is offline. For the overview records described above relative to screen view 500, for example, dependency identification would include crawling the specified set of records to ensure all the data on the overview template will fully render. Such a process would include, for this example, making sufficient fetches to ensure that the reminder times are fetched from linked database objects.

The template caching and template-record caching operations may also be performed using machine-learning recommendations. Thus, the mobile device and the server system may thus store behavior data indicative of data selections made by one or more users of the application. The behavior data can then be used, when performing the template-record caching operation, selecting the specified set of records and the selected template data based on a recommendation from a machine-learning model trained using the behavior data. The data selections can include indications of what types of UI selections are made during offline and/or online activity, including report-generating commands issued by users via the user interface on the mobile device. In some cases, the behavior data for a particular report-generating command may be specified by including a corresponding record and template. In some cases, the specified set of records and selected template data are those templates recommended by the machine-learning model and those records recommended by the machine-learning model that have a time value within a specified time range. This specified time range may be specified in some instances for an organization or a user within an organization.

The various techniques described herein, including method 1000, and all disclosed or suggested variations, may be performed by one or more computer programs. The term "program" is to be construed broadly to cover a sequence of instructions in a programming language that a computing device can execute or interpret. These programs may be written in any suitable computer language, including lower-level languages such as assembly and higher-level languages such as Python.

Program instructions may be stored on a "non-transitory, computer-readable storage medium" or a "non-transitory, computer-readable medium." The storage of program instructions on such media permits execution of the program instructions by a computer system. These are broad terms intended to cover any type of computer memory or storage device that is capable of storing program instructions. The term "non-transitory," as is understood, refers to a tangible medium. Note that the program instructions may be stored on the medium in various formats (source code, compiled code, etc.).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

Similarly, systems that implement the methods described with respect to any of the disclosed techniques are also contemplated. For example, the server portion of an application that supports caching (e.g., application 134) can be run on server computer hardware, commonly without a cloud computer system. A cloud computer system (or cloud computing system) refers to a computer system that provides on-demand availability of computer system resources without direct management by a user. These resources can include servers, storage, databases, networking, software, analytics, etc. Users typically pay only for those cloud services that are being used, which can, in many instances, lead to reduced operating costs. Various types of cloud service models are possible. The Software as a Service (SaaS) model provides users with a complete product that is run and managed by a cloud provider. The Platform as a Service (PaaS) model allows for deployment and management of applications, without users having to manage the underlying infrastructure. The Infrastructure as a Service (IaaS) model allows more flexibility by permitting users to control access to networking features, computers (virtual or dedicated hardware), and data storage space. Cloud computer systems can run applications in various computing zones that are isolated from one another. These zones can be within a single or multiple geographic regions.

A cloud computer system includes various hardware components along with software to manage those components and provide an interface to users. These hardware components include a processor subsystem, which can include multiple processor circuits, storage, and I/O circuitry, all connected via interconnect circuitry. Cloud computer systems thus can be thought of as server computer systems with associated storage that can perform various types of applications for users as well as provide supporting services (security, load balancing, user interface, etc.).

The client portion of the application (e.g., mobile application 154), on the other hand, is run on mobile device hardware platforms Mobile device 150, as noted, can be any type of computing device, including phones, tablets, and desktop devices. These devices will include a processor subsystem (which can include multiple processing elements) that is coupled to a system memory and I/O interfaces via an interconnect such as a system bus. The I/O interfaces can be coupled in turn to one or more I/O devices, such as the mobile device display and wireless network interfaces. The system memory of mobile device 150 is usable store program instructions executable by the processor subsystem to cause mobile device 150 perform various operations described herein, such executing mobile application 154. The system memory can also store data used by mobile application 154, including cached data 148. The system memory may be implemented using different types of computer-readable media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A non-transitory computer-readable medium storing program instructions that are capable of being executed by a computer system to perform operations, the operations comprising:

operating an application server operable to handle calls made from a particular version of a remotely executing application, the particular version having a user interface that includes a supplemental portion based on a set of templates customized for a particular one of a plurality of organizations;

storing record data in a database;

storing template data in the database for the set of templates, a given template of the set of templates specifying data fields for that template and being fully renderable by the particular version, while executing on a mobile device that has a network connection to the application server, by populating the specified data fields with record data from the database;

receiving a request to cache data for the mobile device; and in response to the request, performing a set of caching operations that includes:

a record caching operation that causes a baseline of record data having a set of records to be cached at the mobile device according to a default set of rules that apply to all versions of the application, wherein the record caching operation also caches records according to a custom set of rules that override any conflicting rules in the default set;

a template caching operation that causes at least a subset of the set of templates to be cached at the mobile device; and a template-record caching operation that causes additional record data for the particular version to be cached at the mobile device such that the subset of templates will fully render when the mobile device does not have a network connection to the computer system.

2. The non-transitory computer-readable medium of claim 1, wherein the additional record data and the template data are data of the particular organization.

3. The non-transitory computer-readable medium of claim 1, wherein a native portion of the user interface is programmed using a first programming language and wherein the supplemental portion of the user interface is programmed using a second, different programming language.

4. The non-transitory computer-readable medium of claim 1, wherein the template caching operation causes a total number of templates in the supplemental portion of the user interface for the particular organization to be cached at the mobile device.

5. The non-transitory computer-readable medium of claim 1, wherein the set of records are those records of a particular set of types having time values within a specified time range.

6. The non-transitory computer-readable medium of claim 1, the operations further comprising:

storing behavior data indicative of data selections made by one or more users of the application; and when performing the template-record caching operation, selecting the additional record data based on a recommendation from a machine-learning model trained using the behavior data.

7. The non-transitory computer-readable medium of claim 6, wherein the data selections include report-generating commands issued by users via the user interface on the mobile device, and wherein the behavior data for a particular report-generating command includes a corresponding record and template.

8. The non-transitory computer-readable medium of claim 6, wherein the subset of templates includes templates recommended by the machine-learning model.

9. The non-transitory computer-readable medium of claim 1, wherein the template-record caching operation includes crawling the set of records to identify data dependencies and caching any additional records indicated by the identified data dependencies to ensure that the subset of templates will fully render when the mobile device is offline.

10. A method, comprising:

performing a set of caching operations for a particular version of an application executable on a mobile device, the particular version having a user interface that includes a native portion and a supplemental portion, the supplemental portion including a set of templates that is customized for a particular one of a plurality of organizations, the set of templates specifying data fields, the application being executable when the mobile device is online to communicate with an application server to access sufficient record data to fully render templates for those portions of the user interface selected by a user, the set of caching operations including:

a record caching operation that causes a baseline of record data having a set of records to be cached at the mobile device according to a default set of rules that apply to all versions of the application, wherein the record caching operation also caches records according to a custom set of rules that override any conflicting rules in the default set;

a template caching operation that causes at least a subset of the set of templates to be cached at the mobile device; and a template-record caching operation that causes additional record data for the particular version to be cached at the mobile device such that the subset of templates will fully render for when the mobile device is offline.

11. The method of claim 10, wherein the set of records are those records having a time value within a specified time range.

12. The method of claim 10, wherein the template-record caching operation includes crawling the set of records to identify data dependencies and fetching any additional records indicated by the identified data dependencies to ensure that the subset of templates will fully render when the mobile device is offline.

13. A method comprising:

operating, by a computer system, an application server configured to handle calls made from a particular version of a remotely executing application, the particular version having a user interface with a native portion and a customized supplemental portion that is customized for a particular one of a plurality of organizations;

storing, by the computer system:

record data in a database; and template data for a set of templates corresponding to the customized supplemental portion of the user interface, a given template of the set of templates specifying data fields for that template and being fully renderable by the particular version, while executing on a mobile device that has a network connection to the application server, by populating the specified data fields with record data from the database;

receiving, by the computer system, a request to cache data to the mobile device;

in response to the request, performing, by the computer system, a set of caching operations that includes:

a record caching operation that causes a baseline of record data to be cached at the mobile device according to a default set of rules, wherein the record caching operation causes record data to also be cached according to a custom set of rules that override any conflicting rules in the default set; and a template caching operation that causes at least a subset of the set of templates to be cached at the mobile device; and a template-record caching operation that causes additional record data for the particular version to be cached at the mobile device such that the subset of templates will fully render when the mobile device does not have a network connection to the application server.

14. The method of claim 13, wherein the application, including the native portion of the user interface, is available for use by users of a plurality of organizations, wherein the supplemental portion of the user interface is available for use by only users of the particular organization, and wherein the template caching operation causes template data for all templates of the particular organization to be cached.

15. The method of claim 13, wherein performing the template-record caching operation includes:

accessing a value indicative of a selected set of records, each of which specifies a corresponding one of a set of templates;

retrieving record data for the selected set of records; and for each of the selected set of records, cache a corresponding template for that record along with any other record data for the specified template.

16. The method of claim 15, wherein, for a particular one of the selected set of records and a corresponding template, the corresponding record data includes all data from one or more other dependent records referenced by the particular record, such that the corresponding template will fully render for the particular record.

\*   \*   \*   \*   \*